(12) United States Patent  
Hong et al.

(10) Patent No.: US 12,183,204 B2  
(45) Date of Patent: *Dec. 31, 2024

(54) TRAJECTORY PREDICTION ON TOP-DOWN SCENES AND ASSOCIATED MODEL

(71) Applicant: Zoox, Inc., Foster City, CA (US)

(72) Inventors: Xi Joey Hong, Campbell, CA (US); Benjamin John Sapp, San Francisco, CA (US); James William Vaisey Philbin, Palo Alto, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,880

(22) Filed: Dec. 6, 2021

(65) Prior Publication Data

US 2022/0092983 A1 Mar. 24, 2022

Related U.S. Application Data

(63) Continuation of application No. 16/420,050, filed on May 22, 2019, now Pat. No. 11,195,418, which is a  
(Continued)

(51) Int. Cl.  
*G08G 1/16* (2006.01)  
*B60W 30/095* (2012.01)  
(Continued)

(52) U.S. Cl.  
CPC ......... *G08G 1/164* (2013.01); *B60W 30/0956* (2013.01); *G05D 1/0221* (2013.01);  
(Continued)

(58) Field of Classification Search  
None  
See application file for complete search history.

(56) References Cited

U.S. PATENT DOCUMENTS 5,870,493 A 2/1999 Vogl et al.  
9,176,500 B1 * 11/2015 Teller .................... B60W 30/08  
(Continued)

FOREIGN PATENT DOCUMENTS

JP 2002354468 A 12/2002  
JP 2014203168 A * 4/2013  
(Continued)

OTHER PUBLICATIONS

NPL, Jeon, Hyeong, et al., Traffic Scene Prediction via Deep Learning: Introduction of Multi-Channel Occupancy Grid Map as a Scene Representation, IEEE explore, (https://ieeexplore.ieee.org/abstract/document/8500567) (Oct. 21, 2018) (hereinafter "Jeon").*  
(Continued)

*Primary Examiner* — Jean Paul Cass  
(74) *Attorney, Agent, or Firm* — Lee & Hayes, P.C.

(57) ABSTRACT

Techniques are discussed for determining prediction probabilities of an object based on a top-down representation of an environment. Data representing objects in an environment can be captured. Aspects of the environment can be represented as map data. A multi-channel image representing a top-down view of object(s) in the environment can be generated based on the data representing the objects and map data. The multi-channel image can be used to train a machine learned model by minimizing an error between predictions from the machine learned model and a captured trajectory associated with the object. Once trained, the machine learned model can be used to generate prediction probabilities of objects in an environment, and the vehicle can be controlled based on such prediction probabilities.

20 Claims, 11 Drawing Sheets

Related U.S. Application Data continuation-in-part of application No. 16/151,607, filed on Oct. 4, 2018, now Pat. No. 11,169,531.

(51) Int. Cl.
| | |
|---|---|
| *G05D 1/00* | (2006.01) |
| *G06N 3/08* | (2023.01) |
| *G06N 20/00* | (2019.01) |
| *G06T 7/292* | (2017.01) |

(52) U.S. Cl.
CPC ............ *G05D 1/0276* (2013.01); *G06N 3/08* (2013.01); *G06N 20/00* (2019.01); *G06T 7/292* (2017.01); *G08G 1/166* (2013.01); *G06T 2207/10032* (2013.01); *G06T 2207/30236* (2013.01); *G06T 2207/30241* (2013.01)

(56) References Cited

U.S. PATENT DOCUMENTS

| | | |
|---|---|---|
| 9,248,834 B1 | 2/2016 | Ferguson et al. |
| 9,870,617 B2 | 1/2018 | Piekniewski et al. |
| 10,421,453 B1* | 9/2019 | Ferguson .......... B60W 30/0953 |
| 10,509,970 B2* | 12/2019 | Ogale .................. G06V 20/584 |
| 10,739,769 B2 | 8/2020 | Dean et al. |
| 10,788,836 B2 | 9/2020 | Ebrahimi Afrouzi et al. |
| 10,852,419 B2 | 12/2020 | Zhong et al. |
| 11,195,418 B1* | 12/2021 | Hong ............. B60W 30/18159 |
| 2007/0087756 A1 | 4/2007 | Hoffberg |
| 2010/0063735 A1 | 3/2010 | Kindo et al. |
| 2010/0235285 A1 | 9/2010 | Hoffberg |
| 2010/0317420 A1 | 12/2010 | Hoffberg |
| 2016/0099010 A1* | 4/2016 | Sainath ................... G10L 15/16 704/232 |
| 2017/0031361 A1* | 2/2017 | Olson ............... B60W 30/0956 |
| 2018/0018524 A1* | 1/2018 | Yao ........................ G06V 20/56 |
| 2018/0060701 A1* | 3/2018 | Krishnamurthy .... G06V 10/454 |
| 2018/0144219 A1* | 5/2018 | Kalisman ........... G06K 15/1848 |
| 2018/0157265 A1 | 6/2018 | Kentley-Klay et al. |
| 2019/0340462 A1* | 11/2019 | Pao ........................ G06V 10/82 |
| 2019/0364492 A1* | 11/2019 | Azizi ................ H04W 36/0009 |
| 2020/0110416 A1 | 4/2020 | Hong et al. |
| 2020/0225673 A1 | 7/2020 | Ebrahimi Afrouzi et al. |
| 2020/0284883 A1 | 9/2020 | Ferreira et al. |
| 2021/0026355 A1* | 1/2021 | Chen ....................... G06F 18/22 |
| 2021/0034595 A1* | 2/2021 | Tselikis ................... H04L 51/04 |
| 2021/0063578 A1* | 3/2021 | Wekel ..................... G01S 7/481 |
| 2021/0347377 A1* | 11/2021 | Siebert ............ B60W 30/18154 |
| 2021/0347383 A1* | 11/2021 | Siebert ............... G01C 21/3407 |
| 2022/0363247 A1* | 11/2022 | Hendy .................. B60W 10/20 |
| 2023/0169777 A1* | 6/2023 | Song ..................... G06V 20/58 382/104 |

FOREIGN PATENT DOCUMENTS

| | | |
|---|---|---|
| JP | 2016006568 A | 1/2016 |
| JP | 2016136378 A | 7/2016 |
| WO | WO2020036734 | 2/2020 |

OTHER PUBLICATIONS

Google Machine Translation of Japaense Patent Pub. JP2014203168A to Tagawa (2013).*

Engel, et al., "Dynamic predictions: Oscillations and synchrony in top-down processing", nature reviews neuroscience, retrieved Jan. 13, 2021 at <<https://www.nature/com/articles/35094565>>, 75 pages.

Liu, et al., "An intriguing failing of convolutional neural networks and the CordConv solution" , 32nd Conference on Neural Information Processing Systems (NeurIPS 2018), Canada, 12 pages.

Final Office Action dated Oct. 20, 2020 for U.S. Appl. No. 16/151,607, "Trajectory Prediction on Top-Down Scenes", Hong, 59 pages.

Office Action for U.S. Appl. No. 16/420,050, dated Mar. 25, 2021, Hong, "Trajectory Prediction on Top-Down Scenes and Associated Model", 66 pages.

Office Action for U.S. Appl. No. 16/151,607, dated Apr. 20, 2021, Hong, "Trajectory Prediction on Top-Down Scenes", 82 pages.

Office Action for U.S. Appl. No. 16/151,607, dated Apr. 30, 2020, Hong, "Trajectory Prediction on Top-Down Scenes", 52 pages.

Office Action for U.S. Appl. No. 16/420,050m dated Sep. 30, 2020, Hong, "Trajectory Prediction on Top-Down Scenes and Associated Model", 49 pages.

The PCT Search Report and Written Opinion dated Jan. 2, 2020 for PCT Application No. PCT/US2019/054326, 14 pages.

Refaat, et al., "Agent Prioritization for Autonomous Navigation", Sep. 19, 2019, 8 pages.

Japanese Office Action mailed Feb. 27, 2024 for Japanese Application No. 2021-517762, a foreign counterpart to U.S. Pat. No. 11,169,531, 17 pages.

Chinese Office Action mailed Feb. 29, 2024 for Chinese Application No. 201980065391.6, a foreign counterpart to U.S. Pat. No. 11,169,531, 57 pages.

Chinese Office Action mailed Jul. 10, 2023 for Chinese Patent Application No. 201980065391.6, foreign counterpart to U.S. Appl. No. 16/151,607, 26 pages.

Japanese Office Action mailed Oct. 31, 2023 for Japanese Application No. 2021-517762, a foreign counterpart to U.S. Pat. No. 11,169,531, 16 pages.

Chinese Office Action mailed Jul. 10, 2023 for Chinese Patent Application No. 2019800065391.6, foreign counterpart to U.S. Appl. No. 16/151,607, 26 pages.

Office Action for Japanese Application No. 2021-517762, Dated Jul. 16, 2024, 4 pages.

* cited by examiner

TRAJECTORY PREDICTION ON TOP-DOWN SCENES AND ASSOCIATED MODEL

CROSS REFERENCE TO RELATED APPLICATION

This patent application is a continuation of U.S. patent application Ser. No. 16/420,050, filed May 22, 2019, which is a continuation-in-part of U.S. patent application Ser. No. 16/151,607, filed Oct. 4, 2018, now U.S. Pat. No. 11,169, 531, issued Nov. 9, 2021, which applications are incorporated herein by reference, in their entirety

BACKGROUND

Prediction techniques can be used to determine future states of entities in an environment. That is, prediction techniques can be used to determine how a particular entity is likely to behave in the future. Current prediction techniques often involve physics-based modeling or rules-of-the-road simulations to predict future states of entities in an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
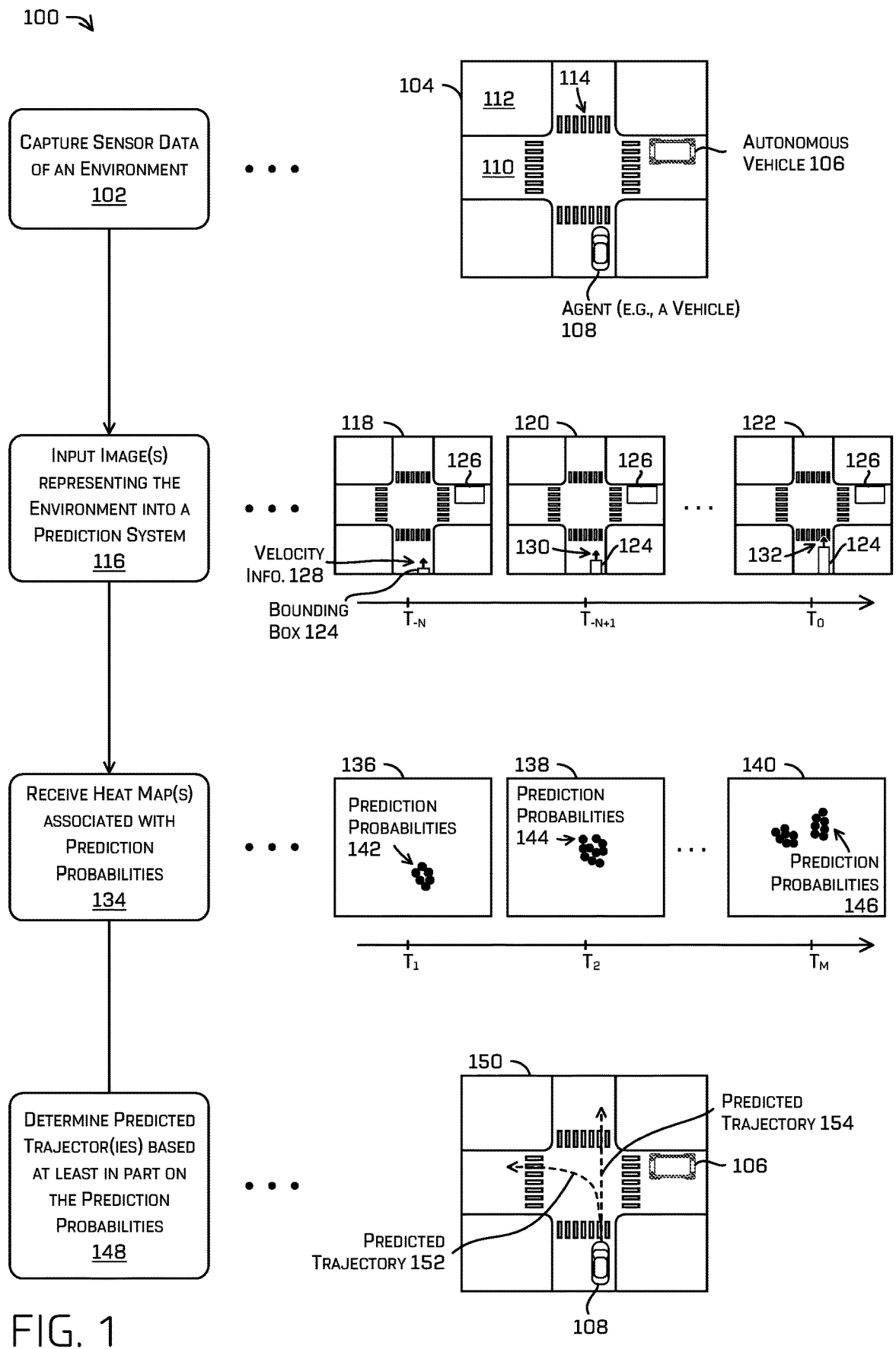
FIG. 1 is a pictorial flow diagram of an example process for capturing sensor data, inputting images representing a top-down view of the environment into a prediction system, receiving heat maps associated with prediction probabilities, and generating a predicted trajectory based at least in part on the prediction probabilities, in accordance with embodiments of the disclosure.

This disclosure is directed to determining predicted trajectories based at least in part on a top-down representation of an environment. For example, sensors of an autonomous vehicle can capture sensor data of an environment, which may include agents separate from the autonomous vehicle, such as other vehicles or pedestrians. An image representing the environment from a top-down perspective can be generated based at least in part on the sensor data. In some examples, the image may include semantic information of the environment and/or the agent. With respect to the agent, such semantic information may comprise a bounding box having extents (e.g., identifying the bounding box as being associated with a vehicle), movement information associated with the bounding box (e.g., velocity, acceleration, etc.), classification information (whether the box represents a vehicle, pedestrian, bicyclist, motorcyclist, etc.). With respect to the environment, the image may comprise semantic information indicative of speed limits, lane widths, lane ends, stop lines, traffic lights, traffic light states, and the like as described in more detail herein.

A plurality of images can be generated representing the environment over time. The image or the plurality of images can be input into a prediction system (e.g., a machine learning model) configured to output a heat map comprising prediction probabilities associated with possible locations of the agent in the future. One or more predicted trajectories can be generated based on the prediction probabilities and output to a planning system to control an operation of the autonomous vehicle.

Sensor data captured by the autonomous vehicle can include LIDAR data, RADAR data, image data, time of flight data, SONAR data, and the like. In some cases, the sensor data can be provided to a perception system configured to determine a type of an agent (e.g., vehicle, pedestrian, bicycle, animal, parked car, tree, building, and the like) in the environment. Further, the perception system can determine, based on the sensor data, movement information about the agent in the environment. The sensor data and any data based on the sensor data can be represented in a top-down view of the environment. For example, the image can represent the agent as a two-dimensional bounding box representing the location of the agent in the environment as well as an extent of the agent (e.g., the length and width of the agent), and a classification of the agent (e.g., vehicle, pedestrian, and the like). Movement information such as velocity information can be represented as a velocity vector associated with the bounding box, although other representations are contemplated.

In some cases, the image to be input into the prediction system can be represented by individual channels of a multichannel image where each channel represents different information about the agent and the environment in which the agent is located. For example, channels may represent, but are not limited to, one or more of: road network information (e.g., semantic labels indicating lanes, crosswalks, stop lines, lane dividers, stop signs, intersections, traffic lights, and the like), traffic light status (e.g., red light, yellow light, green light, etc.), a bounding box associated with the agent, a velocity of the agent in an x-direction and a y-direction, an acceleration of the agent in an x-direction and a y-direction, a blinker status of the agent (e.g., left-turn, right-turn, braking, reverse, hazards, no lights, etc.), and the like. In some examples, the plurality of channels can be input to the prediction system to generate at least one predicted trajectory. In some examples, the image can be input directly to the prediction system (e.g., without generating a plurality of channels based on the image) to generate the at least one predicted trajectory.

In some examples, the number of channels may be reduced into fewer channels. As a non-limiting example, a simple 3-channel (e.g., RGB) image may be used to represent multiple pieces of semantic information. In such an example, a red channel, for instance, may be used to denote a bounding box and the intensity of the red value may be associated with a velocity, acceleration, or the like. Further in such an example, a second channel may encode lane width with intensity indicative of a speed limit, and the like.

In some examples, the prediction system can include a machine learning model trained to output data that can be used to generate one or more predicted trajectories. For example, the machine learning model can output coordinates (e.g., x-coordinates and y-coordinates) associated with the agent (e.g., a third-party vehicle) at one or more times in the future (e.g., 1 second, 2 seconds, 3 seconds, etc.). In some examples, the machine learning model can output coordinates associated with the agent as well as probability information associated with each coordinate. In some examples, such probability information can be represented as an ellipse or other polygon associated with a threshold probability level (e.g., a 65% probability that a location of the agent at a particular time is within the area represented by the ellipse). A predicted trajectory can be generated by interpolating between the coordinates output by the machine learning model. In some examples, the machine learning model can include a convolutional neural network (CNN), which may include one or more recurrent neural network (RNN) layers, such as, but not limited to, long short-term memory (LSTM) layers. In some examples, the machine learning model can output a heat map associated with prediction probabilities. In some examples, at least one predicted trajectory can be determined based at least in part on the heat map.

A heat map can represent a discretized region of the environment proximate to the autonomous vehicle. For example, the heat map can represent a 64×64 grid (or J×K sized grid) representing a 100 meter by 100 meter region around the autonomous vehicle. Of course, the heat map can represent any size of region and can represent any number of discrete portions of the region. In some cases, a portion of the heat map can be referred to as a cell of the heat map. Each cell can comprise a prediction probability representing a probability that the agent will be at the corresponding location in the environment at the time corresponding to the heat map. In some instances, the machine learning model can output a plurality of heat maps, wherein a heat map of the plurality of heat maps can represent probability predictions associated with the agent at a particular time in the future (e.g., 0.5 second, 1 second, 3 seconds, 5 seconds, 10 seconds, etc.).

To determine a predicted trajectory from the heat maps, each heat map can be analyzed individually to determine a highest probability associated with a cell of the heat map. In some cases, the region of the heat map associated with the highest probability can be referred to as a predicted point. In some examples, a predicted point can be selected based at least in part on the highest probability point and one or more costs and/or constraints associated vehicle dynamics of a resulting predicted trajectory. By way of example, if the prediction system outputs five heat maps, the techniques discussed herein can include determining at least five prediction points. A first predicted point can be selected based on corresponding to the highest probability region in the first heat map. A second predicted point can be selected based on a highest probability region in the second heat map and a cost associated with a trajectory between the first predicted point and the second predicted point. Such a cost or constraint may be used, for example, to enforce physical correctness (e.g., to ensure the predicted trajectory follows a physically plausible trajectory). The predicted points can be used to determine a predicted trajectory. In some cases, the predicted trajectory can be determined by interpolating between the points or fitting a curve to the points (e.g., fitting one or more of a polynomial curve, a Bezier curve, a clothoid curve, etc.). In some cases, generating a predicted trajectory and/or selecting the predicted points can be based at least in part on one or more costs and/or constraints associated with vehicle dynamics to prevent or reduce an occurrence where the predicted trajectory represents an unreasonable trajectory (e.g., involving "teleportation" of the vehicle where subsequent points comprise physically impossible motion of the vehicle). Examples of such costs may include, but are not limited to, a velocity cost (e.g., a constant velocity cost), an acceleration cost, an expectation that the agent may follow rules of the road, and the like.

As can be understood, the heat maps may comprise prediction probabilities that may represent a plurality of predicted trajectories for the agent in the environment. In the context of a vehicle traversing an environment, a first predicted trajectory can represent the vehicle making a left-turn through the intersection, while a second predicted trajectory can represent the vehicle going straight through the intersection. In a case where the first predicted trajectory has a higher probability than the second predicted trajectory (e.g., because the sensor data may have captured a left-turn indicator (e.g., a blinker or turn signal) of the vehicle), the operation can include masking, covering, or otherwise removing prediction probabilities of the heat maps that correspond to the first predicted trajectory. Next, the masked heat map may be normalized (e.g., the prediction probabilities can be scaled between 0 and 1) and the highest probability of the masked heat map can be determined as a prediction point. A second trajectory can be based at least in part on the prediction points associated with the masked heat map. That is, the second set of prediction points can be used to generate the second predicted trajectory by evaluating one or more cost functions to determine the second trajectory. This masking process and determining of predicted trajectories can be repeated until a probability of a trajectory does not meet or exceed a prediction threshold. The at least one predicted trajectory can be provided to a planning system of the autonomous vehicle whereby the autonomous vehicle can be controlled based at least in part on the at least one predicted trajectory. In at least other examples, all possible predicted trajectories and/or their corresponding uncertainties can be output to such a planning system.

In some instances, one or more heat maps can be provided to a planning system instead of or in addition to the at least one predicted trajectory.

The techniques discussed herein can improve a functioning of a computing device in a number of additional ways. In some cases, representing the environment and the agent(s) in the environment as a top-down view can represent a simplified representation of the environment for the purposes of generating at least one predicted trajectory. In some cases, the image can represent the environment without extracting particular features of the environment, which may simplify the generation of the prediction system and subsequent generation of the at least one predicted trajectory. In some cases, generating the at least one predicted trajectory can be provided to a planner system of an autonomous vehicle, which may allow the autonomous vehicle to generate more accurate and/or safer trajectories for the autonomous vehicle to traverse an environment. For example, a predicted trajectory suggesting a likelihood of a collision or a near-collision may allow the autonomous vehicle to alter a trajectory (e.g., change lanes, stop, etc.) in order to safely traverse the environment. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In another example, the techniques can be utilized in an aviation or nautical context, or in any system involving agents or entity that may be associated with behavior that is unknown to the system. Further, although discussed in the context of LIDAR data, sensor data can include any two-dimensional, three-dimensional, or multi-dimensional data such as image data (e.g., stereo cameras, time-of-flight data, and the like)), RADAR data, SONAR data, and the like. Additionally, the techniques described herein can be used with real data (e.g., captured using sensor(s)), simulated data (e.g., generated by a simulator), or any combination of the two.

FIG. 1 is a pictorial flow diagram 100 of an example process for capturing sensor data, inputting images representing a top-down view of the environment into a prediction system, receiving heat maps associated with prediction probabilities, and generating a predicted trajectory based at least in part on the prediction probabilities, in accordance with embodiments of the disclosure.

At operation 102, the process can include capturing sensor data of an environment. In some examples, the sensor data can be captured by one or more sensors on an autonomous vehicle. For example, the sensor data can include data captured by one or more of a LIDAR sensor, a RADAR sensor, an image sensor, a time of flight sensor, a SONAR sensor, and the like.

An example 104 illustrates an environment in which an autonomous vehicle 106 is traversing the environment. In some examples, the autonomous vehicle 106 can perform the operations of the process 100, which can include capturing the sensor data of the environment. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

An agent 108 is also located in the environment. In some examples, the agent 108 can represent a vehicle, a pedestrian, a bicycle, an animal, and the like. The environment illustrated in the example 104 can include a driveable region 110 and a non-driveable region 112. In some examples, the operation 102 can include localizing the autonomous vehicle 106 in the environment and accessing map data associated with the environment. For example, map data can comprise map elements such as a crosswalk element 114 indicating a region of the environment corresponding to a crosswalk. Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

In some instances, the sensor data captured in the operation 102 can be used to determine information about the agent 108, including but not limited to, a type of the agent (e.g., semantic information indicating a classification of the agent, such as a vehicle, pedestrian, bicycle, animal, and the like). In some instances, the operation 102 can include determining the type of the agent 108, a bounding box associated with the agent 108, and/or movement information associated with the agent, as discussed herein.

At operation 116, the process can include inputting image(s) representing the environment into a prediction system. In some instances, the images(s) can represent the environment from a top-down perspective, as illustrated in images 118, 120, and 122. That is, the images 118, 120, and 122 can represent the environment depicted in example 104 over time. For example, the image 118 can represent the environment at time $T_{-N}$, the image 120 can represent the environment at time $T_{-N+1}$, and the image 122 can represent the environment at time $T_0$. For example, the image 118 can represent the environment 2 seconds in the past, the image 120 can represent the environment 1 second in the past, and the image 122 can represent the environment at the present time (e.g., time=0). Of course, the images 118, 120, and 122 can represent the environment at any period in time, and are not limited to the express times discussed herein.

As introduced above, the image 118 can represent the environment at time $T_{-N}$, and may include a bounding box 124 representing a location and extent (e.g., length and width) of the agent 108 at the indicated time. Further, the image 118 can include a bounding box 126 representing the autonomous vehicle 106. As can be understood, the image 118 can include any number of static objects (e.g., buildings, trees, curbs, sidewalks, map elements, etc.) or dynamic objects (e.g., agents) in the environment at any time, and is not limited to one agent (e.g., the bounding box 124 representing the agent 108), as discussed herein.

The image 118 can further include velocity information 128 which is represented in the image 118 as a velocity vector associated with the bounding box 124. As discussed above, the image 118 can include additional information representing objects in the environment or states of objects in the environment. For example, the image 118 can include lane information or corridor information indicating that a lane associated with the bounding box 126 (e.g., associated with the autonomous vehicle 106) is controlled by a traffic light, which, for the sake of simplicity, may correspond to a red light. Accordingly, in this example, a position of the bounding box 126 can remain constant in the images 118, 120, 122, although the autonomous vehicle 106 may be moving in the environment while capturing sensor data and determining at least one predicted trajectory, as discussed herein.

As can be understood, the bounding box 124 (e.g., the agent 108) can be associated with different locations and/or movement information over time. Accordingly, the image 120 can include velocity information 130 that is the same or different as the velocity information 128, and the image 122 can include velocity information 132 that is the same or different as the velocity information 128 and 130. Further, a location of the bounding box 124 is updated throughout the images 118, 120, and 122 to illustrate a movement of the agent 108 as the agent 108 traverses the environment.

Further, as discussed below in the context of FIGS. 4A and 4B, the image(s) input into the prediction system may be decomposed into a plurality of channels prior to input into the prediction system (e.g., FIG. 4A) or may be input into the prediction system without generating a plurality of channels (e.g., FIG. 4B).

At operation 134, the process can include receiving heat map(s) associated with prediction probabilities. In some examples, the operation 134 can include receiving heat maps 136, 138, and 140 from a prediction system, wherein the heat maps 136, 138, and 140 are based at least in part on the image(s) 118, 120, and 122 input into the prediction system in the operation 116. In some instances, the heat map(s) 136, 138, and 140 can represent (e.g., from a top-down perspective of the environment) the prediction probabilities indicative of a probability that the agent 108 will be at the corresponding location in the environment at the time corresponding to a respective heat map. That is, the heat maps 136, 138, and 140 can represent the prediction probabilities of the agent 108 in the future.

The heat map 136 can represent prediction probabilities 142 associated with the agent 108 at time $T_1$, the heat map 138 can represent prediction probabilities 144 associated with the agent 108 at time $T_2$, and the heat map 140 can represent prediction probabilities 146 associated with the agent 108 at time $T_M$. For example, the heat map 136 can represent the prediction probabilities 142 at 1 second in the future, the heat map 138 can represent the prediction probabilities 144 at 2 seconds in the future, and the heat map 140 can represent the prediction probabilities 146 at the 5 seconds in the future. Of course, the heat maps 136, 138, and 140 can represent the prediction probabilities at any period in time, and are not limited to the express times discussed herein.

In some instances, the prediction probabilities 142, 144, and 146 can represent a probability distribution over the area represented by the respective heat maps 136, 138, and 140.

At operation 148, the operation can include determining predicted trajector(ies) based at least in part on the prediction probabilities. In some instances, the operation 148 can include determining at least one predicted trajectory associated with the agent 108.

An example 150 illustrates predicted trajectories 152 and 154 associated with the agent 108, as determined by the autonomous vehicle 106. In some instances, the predicted trajectory 152 can represent a most probable predicted trajectory for the agent 108 to traverse in the environment based on the sensor data captured by the autonomous vehicle 106 and based on the outputs from the prediction system. In some instances, the predicted trajectory 154 can represent a second most probable predicted trajectory for the agent 108 to traverse in the environment, based on the aforementioned factors. That is, the operation 148 can include ranking or associating a confidence value or probability associated with each of the predicted trajectories to determine the most likely trajectory for the agent 108 to follow. In some instances, the predicted trajectories 152 and 154 can be associated with individual uncertainties. Additional details of predicted trajectories are discussed below in connection with FIGS. 3 and 5, as well as throughout this disclosure.

In some instances, the process 100 can be performed in parallel for each agent in the environment. In some instances, the process 100 can be performed on a single set of images to generate at least one trajectory for each agent of a plurality of agents in the environment.

Figure 2:
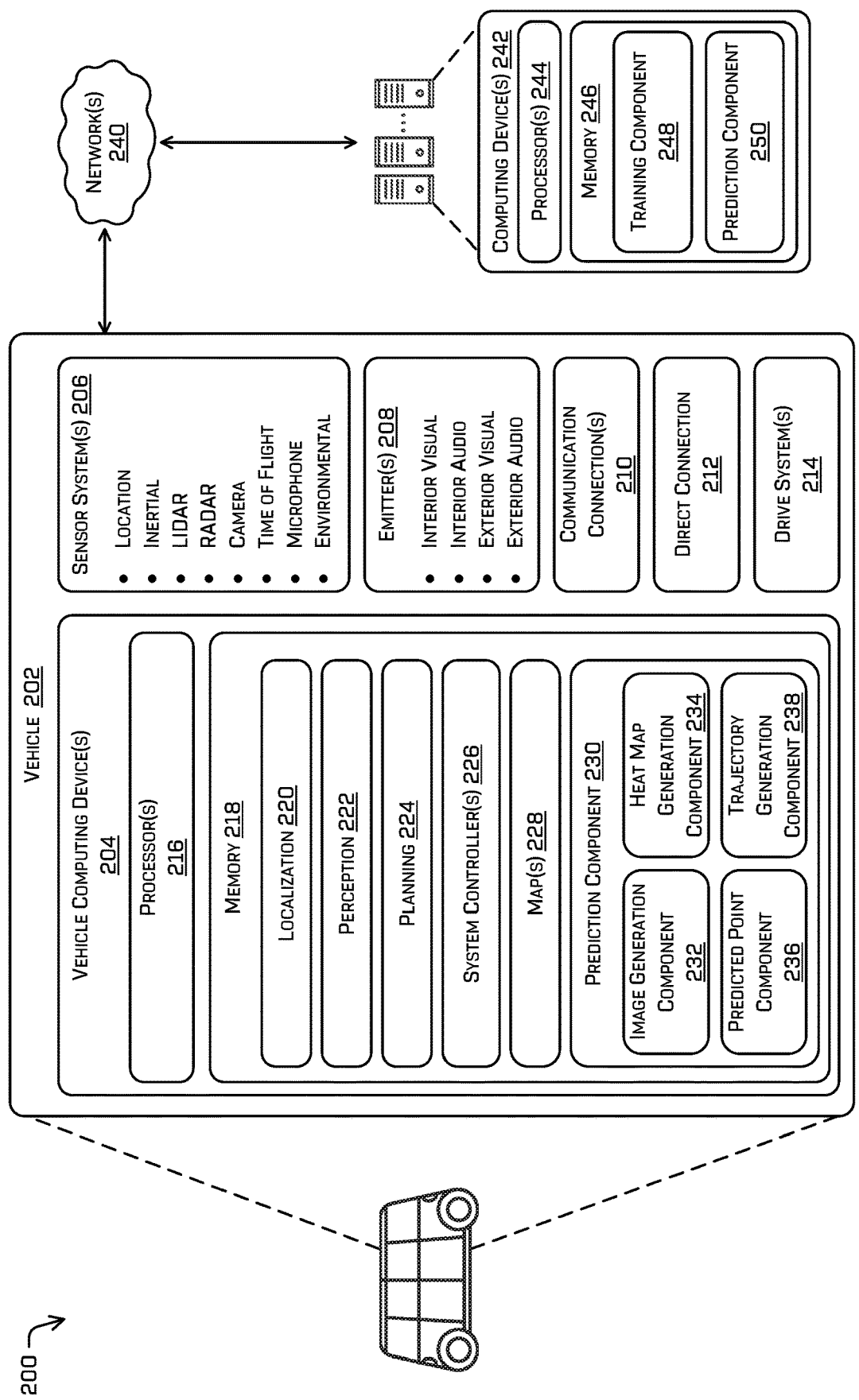
FIG. 2 depicts a block diagram of an example system for implementing the techniques described herein.

FIG. 2 depicts a block diagram of an example system 200 for implementing the techniques described herein. In at least one example, the system 200 can include a vehicle 202.

The vehicle 202 can include a vehicle computing device 204, one or more sensor systems 206, one or more emitters 208, one or more communication connections 210, at least one direct connection 212, and one or more drive systems 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, a planning component 224, one or more system controllers 226, one or more maps 228, and a prediction component 230 comprising an image generation component 232, a heat map generation component 234, a predicted point component 236, and a trajectory generation component 238. Though depicted in FIG. 2 as residing in memory 218 for illustrative purposes, it is contemplated that the localization component 220, the perception component 222, the planning component 224, the one or more system controllers 226, the one or more maps 228, the prediction component 230, the image generation component 232, the heat map generation component 234, the predicted point component 236, and the trajectory generation component 238 may additionally, or alternatively, be accessible to the vehicle 202 (e.g., stored remotely).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for generating map data, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202.

The memory 218 can further include one or more maps 228 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 228 can include at least one map (e.g., images and/or a mesh). In some examples, the vehicle 202 can be controlled based at least in part on the maps 228. That is, the maps 228 can be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 can be stored on a remote computing device(s) (such as the computing device(s) 242) accessible via network(s) 240. In some examples, multiple maps 228 can be stored based on, for example, a characteristic (e.g., type of entity, time of day, day of week, season of the year, etc.). Storing multiple maps 228 can have similar memory requirements, but increase the speed at which data in a map can be accessed.

In general, the prediction component 230 can generate predicted trajectories of objects in an environment. For example, the prediction component 230 can generate one or more predicted trajectories for vehicles, pedestrians, animals, and the like within a threshold distance from the vehicle 202. In some instances, the prediction component 230 can measure a trace of an object and generate a trajectory for the object based on observed and predicted behavior.

In some examples, the image generation component 232 can include functionality to generate images representing a top-down view of a scene. Examples of such images generated by the image generation component 232 are shown in FIG. 1 as images 118, 120, and 122.

In some examples, the image generation component 232 can generate an image representing an area (e.g., a receding horizon) around the vehicle 202. In some examples, the image may represent a 100 meter×100 meter area around the vehicle 202, although any area is contemplated. The image generation component 232 can receive data about agents in the environment from the perception component 222 and can receive data about the environment itself from the localization component 220, the perception component 222, and the one or more maps 228. The image generation component 232 can generate a top-down view of the environment including agents in the environment (e.g., represented by a bounding box, as discussed herein), semantic information about the agent (e.g., a classification type), movement information (e.g., velocity information, acceleration information, etc.), and the like. The image generation component 232 can further generate image elements (e.g., symbols) in the image representing the various attributes of the agent(s) and the environment, including but not limited to: one or more velocity vectors, one or more acceleration vectors, lighting indicators (e.g., braking lights of the agent, turn signal lights of the agent, etc., represented as respective indicator status), traffic light information (e.g., status of a traffic light), lane information (e.g., whether the lane is a left turn only lane, right turn only lane, etc.), and the like.

In some examples, the image generation component 232 can generate one or more images comprising semantic information of the environment, as discussed in detail herein.

In some examples, the image generation component 232 can generate one or more images representing a trace of an agent in the environment. As discussed above in FIG. 1, the images 118, 120, and 122 can represent prior information about the state of the environment and agents in the environment that can be used to generate at least one predicted trajectory, as discussed herein.

In any of the examples discussed herein, the image generation component 232 may generate an image having multiple channels, wherein each channel is representative of some information (semantic or otherwise).

In some examples, the heat map generation component 234, can include functionality to receive the image(s) generated by the image generation component 232 and to generate one or more heat maps including prediction probabilities, as discussed herein.

In some instances, the heat map generation component 234 can include one or more machine learning models trained to output one or more heat maps based on top-down images input into the model. In some examples, the heat map generation component 234 can include a convolutional neural network (CNN), which may or may not include one or more recurrent neural network (RNN) layers, e.g., long short-term memory (LSTM) layers.

In some examples, a heat map output by the heat map generation component 234 can represent a discretized region of the environment proximate to the autonomous vehicle. For example, the heat map can represent a 64×64 grid (or J×K sized grid) representing a 100 meter by 100 meter region around the autonomous vehicle. In some examples, an area represented by a heat map can correspond to the area represented by the images input to the heat map generation component 234. Of course, the heat map can represent any size of region and can represent any number of discrete portions of the region. In some cases, a portion of the heat map can be referred to as a cell of the heat map. Each cell can comprise a prediction probability representing a probability that the agent will be at the corresponding location in the environment at the time corresponding to the heat map. In some instances, the machine learning model can output a plurality of heat maps, wherein a heat map of the plurality of heat maps can represent probability predictions associated with the agent at a particular time in the future (e.g., 0.5 second, 1 second, 3 seconds, 5 seconds, 10 seconds, etc.).

In some examples, the heat map generation component 234 can be trained to generate any number of heat maps based on any number of input images. For example, the heat map generation component 234 can receive N number of input images and can output M number of heat maps.

In some examples, the predicted point component 236, can include functionality to determine predicted point(s) representing predicted location(s) of an agent in the environment. In some examples, the predicted point component 236 can receive at least one heat map from the heat map generation component 234. The predicted point component 236 can determine the predicted point associated with the heat map based at least in part on a cell associated with a highest probability and/or based at least in part on cost(s) associated with generating a predicted trajectory associated with the predicted point.

For example, the predicted point component 236 can select a point, cell, or region of a heat map as a predicted point based at least in part on evaluating one or more cost functions associated with vehicle dynamics. In at least some examples, such costs may be associated with preventing or reducing an occurrence where the predicted trajectory represents an unreasonable trajectory (e.g., involving "teleportation" of the vehicle, too high of a change in velocity, etc.). Examples of such costs may include, but are not limited to, a positional based cost (e.g., limiting the distance allowed between predicted points), a velocity cost (e.g., a constant velocity cost enforcing a constant velocity through the predicted trajectory), an acceleration cost (e.g., enforcing acceleration bounds throughout the predicted trajectory), an expectation that the agent may follow rules of the road, and the like. In at least some examples, the probability associated with the cell may be multiplied with the cost (which, in at least some examples, may be normalized) such that the point (e.g., a candidate point) associated with the highest value of the cost times probability is selected as the predicted point.

Further, in some cases, the predicted point component 236 can determine predicted points for a plurality of heat maps and can provide the predicted points to the trajectory generation component 238 to determine a predicted trajectory based at least in part on the predicted points.

In some instances, after determining a predicted point for each heat map, the predicted point component 236 can receive a predicted trajectory from the trajectory generation component 238 and can mask regions of the heat map associated with the predicted trajectory to generate a masked heat map. The predicted point component 236 can normalize the remaining, unmasked prediction probabilities and can determine a predicted point associated with the masked heat map. An additional predicted point can determined for each masked heat map, and the additional predicted points can be provided to the trajectory generation component 238 to determine an additional predicted trajectory. In some instances, the masking operations and the operations of determining predicted points can be repeated until a prediction probability or a probability of a resulting predicted trajectory is below a threshold value. In other examples, such a process can be repeated until the heat map is completely masked. Additional details of determining a predicted point are discussed below in connection with FIG. 3.

In some instances, the predicted point component 236 can receive images generated by the image generation component 232 to generate one or more predicted points directly (e.g., without determining the predicted points from heat map(s) provided by the heat map generation component 234). In such a case, the predicted point component 236 can comprise a CNN, which may or may not include one or more RNN (which may be LSTM) layers.

In some examples, the trajectory generation component 238 can include functionality to receive one or more predicted points from the predicted point component 236 to generate one or more predicted trajectories. In some examples, the trajectory generation component 238 can generate a curve based at least in part on the predicted points as a predicted trajectory.

In some instances, the trajectory generation component 238 can provide the at least one predicted trajectory to the planning component 224, which in turn can generate a trajectory for the vehicle 202 to follow.

In some instances, the heat map generation component 234 can provide the heat map(s) directly to the planning component 224 (e.g., with or without predicted trajectories), which in turn can generate a trajectory for the vehicle 202 to follow.

In some instances, aspects of some or all of the components discussed herein can include any models, algorithms, and/or machine learning algorithms. For example, in some instances, the components in the memory 218 (and the memory 246, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 206 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 240, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 240. For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In some examples, the vehicle 202 can send sensor data to one or more computing device(s) 242 via the network(s) 240. In some examples, the vehicle 202 can send raw sensor data to the computing device(s) 242. In other examples, the vehicle 202 can send processed sensor data and/or representations of sensor data to the computing device(s) 242. In some examples, the vehicle 202 can send sensor data to the computing device(s) 242 at a particular frequency, after a lapse of a predetermined period of time, in near real-time, etc. In some cases, the vehicle 202 can send sensor data (raw or processed) to the computing device(s) 242 as one or more log files.

The computing device(s) 242 can include processor(s) 244 and a memory 246 storing a training component 248 and a prediction component 250.

In some instances, the training component 248 can include functionality to train a machine learning model to output one or more predicted points, one or more confidence values associated with the one or more predicted points, or one or more heat maps including prediction probabilities. For example, the training component 248 can receive a set of images representing a top-down view of an environment. In some cases, the set of images can represent an agent traversing through an environment for a period of time, such as 5 seconds, 7 seconds, 10 seconds, 20 seconds, and the like. At least a portion of the set of images can be used as an input to train the machine learning model, and at least a portion of the set of images can be used as ground truth information for training the machine learning model. As a non-limiting example, a first set (e.g., 3, 4, 5, or more) of a sequence of images may be input into the machine learned model. A second set of images (or trajectory information associated therefrom—e.g., by extracting positions and/or velocities from the images) in the sequence of images immediately preceding the first set may then be used as ground truth for training the model. Thus, by providing images of recorded trajectories where agents traverse an environment, the prediction components 230 and 250 can be trained to output predicted points, confidence values associated with the predicted points, or one or more heat maps including prediction probabilities, as discussed herein.

In some instances, the prediction component 250 can substantially correspond to the prediction component 230 and can include functionality to generate predicted trajectories of objects in an environment. For example, the prediction component 250 can generate one or more predicted trajectories for vehicles, pedestrians, animals, and the like within a threshold distance from the vehicle 202. In some instances, the prediction component 250 can measure a trace of an object and generate a trajectory for the object based on observed and predicted behavior.

The processor(s) 216 of the vehicle 202 and the processor(s) 244 of the computing device(s) 242 can be any suitable processor capable of executing instructions to process data and perform operations as described herein. By way of example and not limitation, the processor(s) 216 and 244 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 246 are examples of non-transitory computer-readable media. The memory 218 and 246 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 218 and 246 can include at least a working memory and a storage memory. For example, the working memory may be a high-speed memory of limited capacity (e.g., cache memory) that is used for storing data to be operated on by the processor(s) 216 and 244. In some instances, the memory 218 and 246 can include a storage memory that may be a lower-speed memory of relatively large capacity that is used for long-term storage of data. In some cases, the processor(s) 216 and 244 cannot operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 can be associated with the computing device(s) 242 and/or components of the computing device(s) 242 can be associated with the vehicle 202. That is, the vehicle 202 can perform one or more of the functions associated with the computing device(s) 242, and vice versa.

Figure 3:
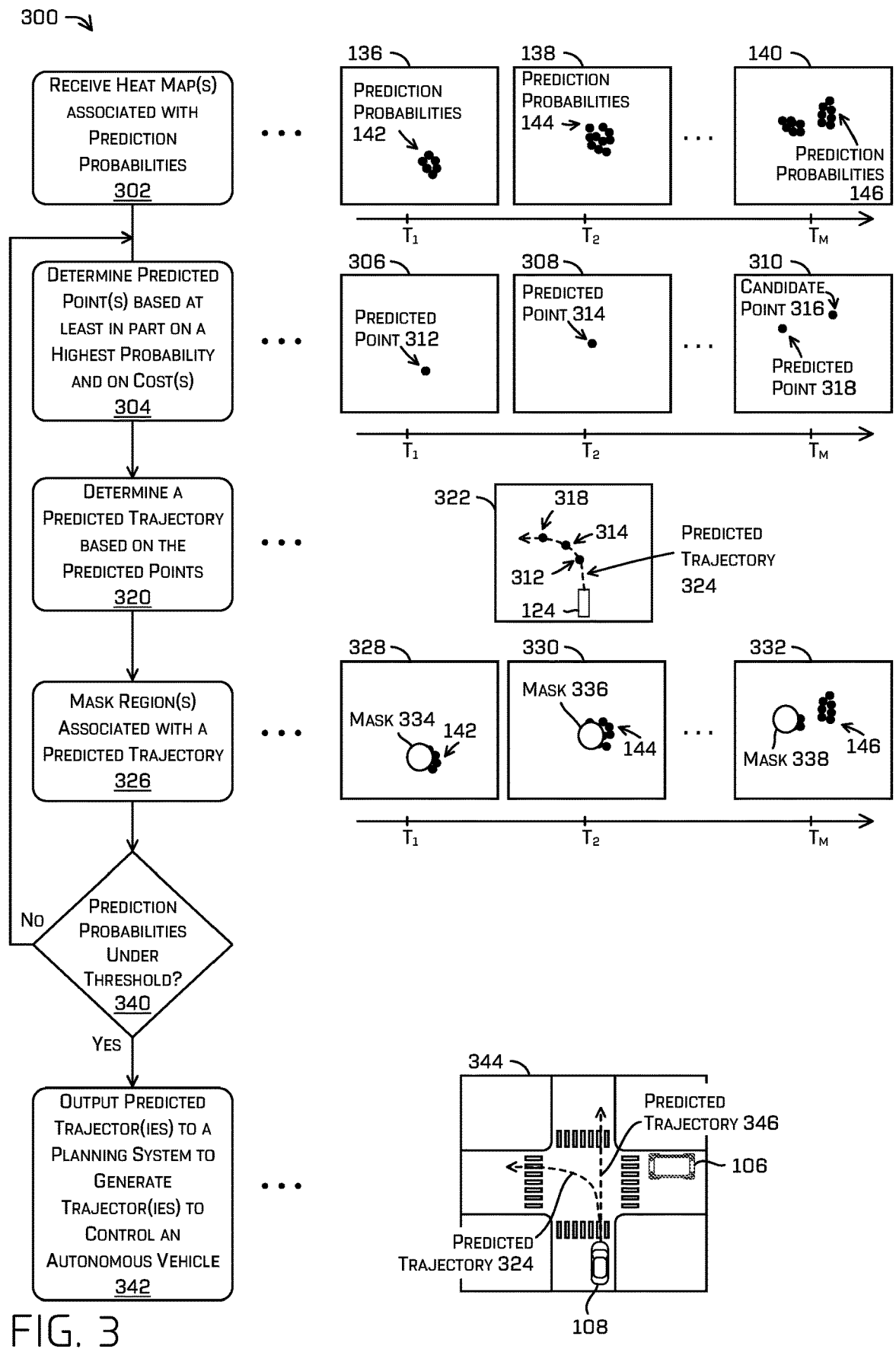
FIG. 3 is a pictorial flow diagram of an example process for receiving heat maps associated with prediction probabilities, determining a predicted point based at least in part on a highest probability in each heat map, and generating one or more predicted trajectories based at least in part on a plurality of predicted points, in accordance with embodiments of the disclosure.

FIG. 3 is a pictorial flow diagram of an example process 300 for receiving heat maps associated with prediction probabilities, determining a predicted point based at least in part on a highest probability in each heat map, and generating one or more predicted trajectories based at least in part on a plurality of predicted points, in accordance with embodiments of the disclosure.

At operation 302, the process can include receiving heat map(s) associated with prediction probabilities. In some instances, the operation 302 can include receiving the heat maps 136, 138, and 140, as discussed above in connection with FIG. 1. The heat map 136 can include the prediction probabilities 142, which may represent a probability of a location of the agent 108 in the environment at time $T_1$. The heat map 138 can include the prediction probabilities 144, which may represent a probability of a location of the agent 108 in the environment at time $T_2$. And the heat map 140 can include the prediction probabilities 146, which may represent a probability of a location of the agent 108 in the environment at time $T_M$.

At operation 304, the process can include determining predicted point(s) based at least in part on a highest probability and on cost(s). FIG. 3 illustrates examples 306, 308, and 310 representing a predicted point as determined from the heat maps 136, 138, and 140, respectively.

The example 306 illustrates the predicted point 312 representing a highest probability of the prediction probabilities 142 included in the heat map 136. In some instances, for a first heat map in a series of heat maps, the first predicted point (e.g., the predicted point 312) can correspond to a highest probability of the heat map 136.

The example 308 illustrates the predicted point 314 based at least in part on a highest probability of the prediction probabilities 144 included in the heat map 138 and on one or more costs. For example, the predicted point 314 can be selected to maximize a probability associated with the predicted point 314 and to penalize selecting a point (e.g., a candidate point) as a predicted point based on one or more cost functions associated with vehicle dynamics to prevent or reduce an occurrence where the predicted trajectory represents an unreasonable trajectory (e.g., involving "teleportation" of the vehicle), or otherwise has a high associated cost. Examples of such costs and/or constraints may include, but are not limited to, a positional cost (e.g., such that subsequent predicted points selected follow a physically plausible trajectory), a velocity cost (e.g., a constant velocity cost), an acceleration cost, an expectation that the agent may follow rules of the road, and the like.

The example 310 illustrates a candidate point 316 and a predicted point 318. In some examples, the candidate point 316 may represent a highest probability of the prediction probabilities 146 included in the heat map 140. In some examples, the predicted point 318 may represent a probability that is less than the highest probability as the candidate point 316. However, because selecting the candidate point 316 as the predicted point would incur high cost because such a trajectory based on the predicted points 312 and 314 and the candidate point 316 would represent the agent 108 "teleporting" from a location associated with the predicted point 314 to a location associated with the candidate point 316.

Instead, the operation 304 can include selecting the predicted point 318 based at least in part on costs associated with a predicted trajectory based at least in part on the predicted points 312, 314, and 318.

At operation 320, the process can include determining a predicted trajectory based on the predicted points. As illustrated in an example 322, the operation 320 can interpolating between the predicted points 312, 314, and 318 to determine a predicted trajectory 324.

At operation 326, the process can include masking region(s) associated with a predicted trajectory. Examples 328, 330, and 332 illustrate the heat maps 136, 138, and 140, respectively, with masks 334, 336, and 338 obscuring (in whole or in part) the prediction probabilities 142, 144, and 146, respectively. In some examples, the mask 334 can represent a region associated with the predicted point 312. For example, the mask 334 can represent a circle or other polygon center around or associated with the predicted point 312. In some examples, the mask 334 can represent a circle having a radius of 1 meter, although the mask 334 can represent any size. In some examples, the mask 336 can be associated with the predicted point 314, and the mask 338 can be associated with the predicted point 318.

In some examples, a mask can be based at least in part on the predicted trajectory 324. For example, a mask can correspond to a lane element represented in map data traversed by the predicted trajectory 324.

In some examples, the operation 326 can generate masked heat maps corresponding to the heat maps 136, 138, and 140, respectively.

At operation 340, the process can include determining whether prediction probabilities are under a threshold value. For example, the operation 340 can include determining whether the unmasked portions of the prediction probabilities associated with each heat map are under a threshold value. If "no," (indicating there are prediction probabilities that meet or exceed the threshold value), the process can return to the operation 304 to determine one or more predicted points based on the masked heat maps, which in turn can be used to determine additional predicted trajectories.

For example, because the candidate point 316 was not masked by the mask 338 in the example 332, such a predicted point could be used to determine an additional predicted trajectory.

In some examples, the operation 340 or 304 can include normalizing the unmasked prediction probabilities (e.g., scaling the unmasked prediction probabilities between 0 and 1) prior to determining an additional predicted trajectory.

When there are no prediction probabilities under the threshold (e.g., "yes" in the operation 340), the process can continue to operation 342. In at least some examples, operation may continue to operation 304 if there are any unmasked portions of the heatmap remaining (or less than some threshold amount). In such examples, all possible (or probable) trajectories may be determined in accordance with the techniques described herein.

At operation 342, the process can include outputting predicted trajector(ies) to a planning system to generate trajector(ies) to control an autonomous vehicle. An example 344 illustrates the predicted trajectory 324 (e.g., based at least in part on the predicted points 312, 314, and 318) and a predicted trajectory 346 (e.g., based at least in part on the candidate point 316, which may have been determined to be a predicted point for the predicted trajectory 346). In some examples, the predicted trajectories can be output to the planning component 224 of the autonomous vehicle 106. The planning system 224 can generate one or more trajectories for the autonomous vehicle 106 to follow based at least in part on the at least one predicted trajectory. In at least some examples, the trajector(ies) may comprise uncertainties associated with each predicted point, an uncertainty of the trajectory as a whole, or a heat map.

Figure 4A:
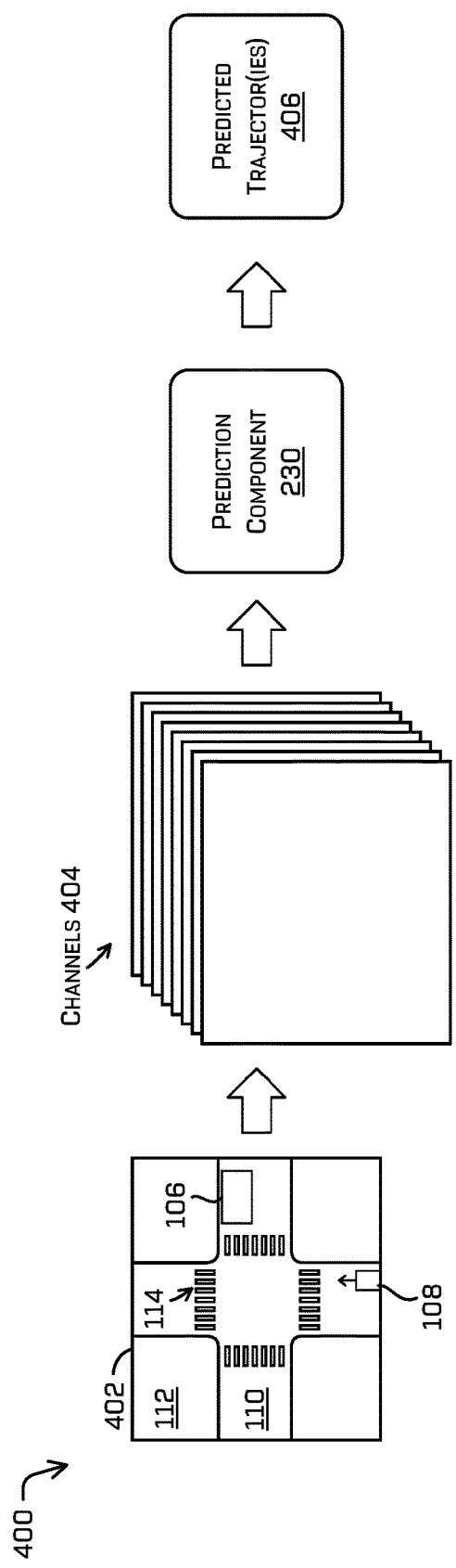
FIGS. 4A and 4B are example illustrations of inputs to the prediction system to determine one or more predicted trajectories, in accordance with embodiments of the disclosure.
Figure 4B:
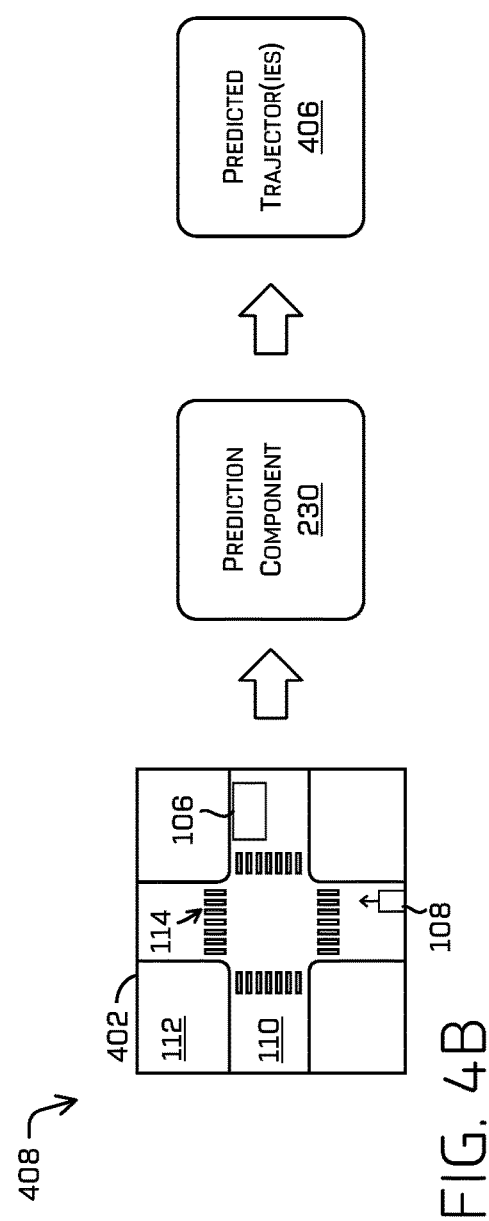

FIGS. 4A and 4B are example illustrations of inputs to the prediction system to determine one or more predicted trajectories, in accordance with embodiments of the disclosure.

FIG. 4A illustrates an example 400 where an input image 402 is used to generate a plurality of channels 404, which are subsequently input to the prediction component 230 to determine one or more predicted trajector(ies) 406

In some examples, individual aspects of the input image 402 can be used to generate an individual channel of the channels 404. For example, an individual channel may represent, but are not limited to, one or more of: a bounding box (e.g., the bounding box 124, with a color of the bounding box representing a classification of the agent associated with the bounding box), a velocity of the bounding box in an x-direction and a y-direction (where a velocity can be represented as a vector in one channel or in multiple channels, with the x-velocity and the y-velocity represented in different channels), an acceleration of the agent in an x-direction and a y-direction (where an acceleration can be represented as a vector in one channel or in multiple channels, with the x-acceleration and the y-acceleration represented in different channels), a blinker status associated with the bounding box (e.g., left-turn, right-turn, braking, reverse, hazards, no lights, etc.), road network information (e.g., semantic labels indicating lanes, crosswalks, stop signs, intersections, traffic lights, and the like), traffic light status (e.g., red light, yellow light, green light, etc.), and the like. In some examples, the plurality of channels can be input to the prediction system to generate at least one predicted trajectory FIG. 4B illustrates an example 408 where the input image 402 is input to the prediction component 230 to determine the predicted trajectories 406. In contrast to the example 400, the example 408 may not include generating a plurality of channels associated with the image 402, and may instead include directly inputting the image 402 into the prediction component 230.

Figure 5:
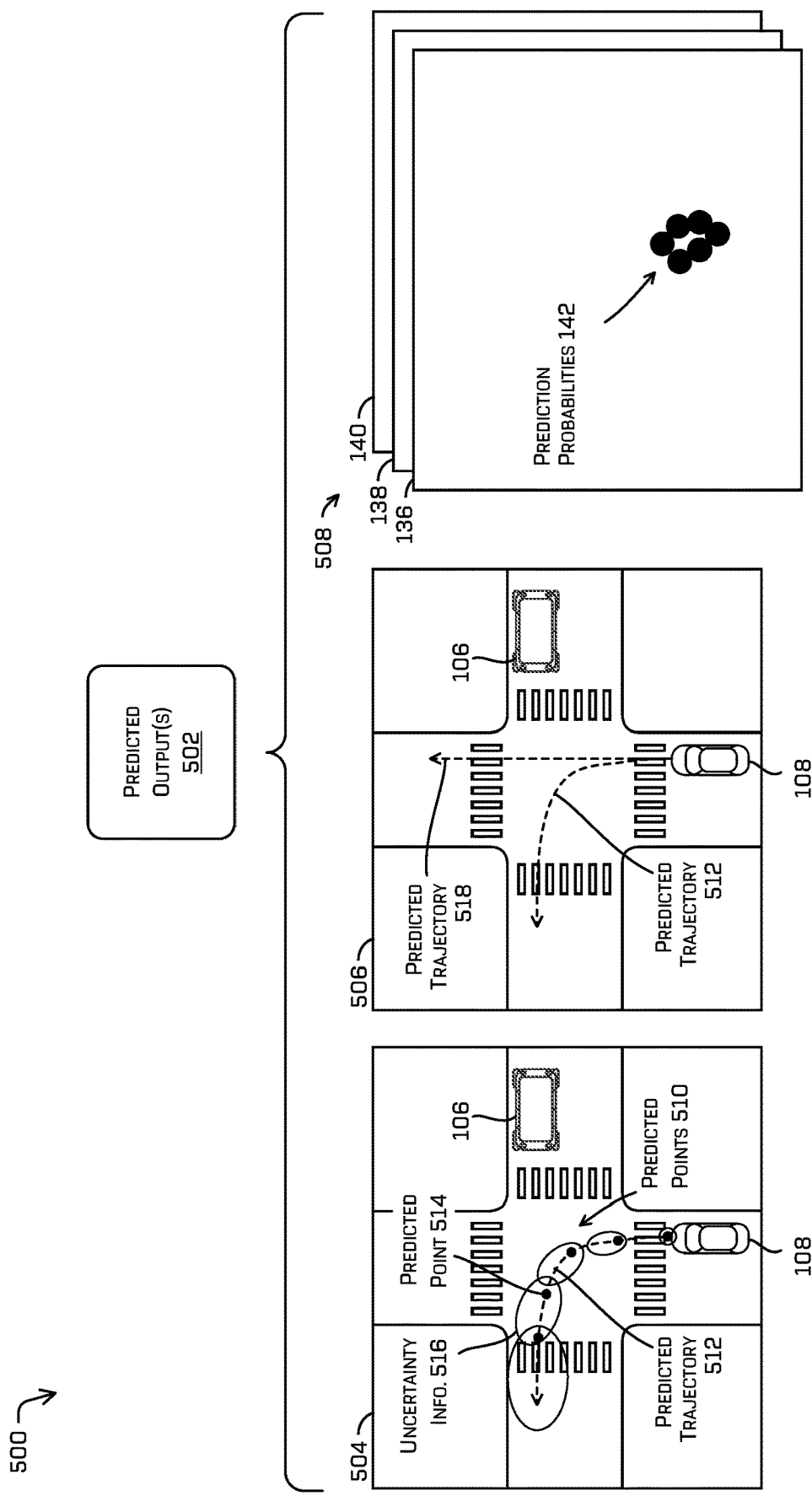
FIG. 5 is an illustration of various predicted trajectories as output by a prediction system, in accordance with embodiments of the disclosure.

FIG. 5 is an illustration 500 of various predicted output(s) 502 by a prediction system, in accordance with embodiments of the disclosure. The illustration 500 provides three representative examples 504, 506, and 508 of the predicted output(s) 502 output by the prediction component 230, as discussed herein.

The example 504 shows predicted points 510 and an associated predicted trajectory 512. In some instances, the predicted points 510 can be output directly by the predicted point component 236 of FIG. 2. In some cases, the predicted trajectory 512 can be generated by interpolating between the predicted points 510 and may include smoothing the predicted trajectory 512 to optimize vehicle dynamics, comfort, and the like.

The example 504 includes an individual predicted point 514 associated with individual uncertainty information 516. In some examples, the uncertainty information 516 can represent a region of the environment indicative of a particular probability that a location of the agent 108 will be located with the area represented by the uncertainty information 516 at the time associated with the predicted point 514. In some examples, the certainty information can be output by the predicted point component 236 in association with the predicted point 514.

The example 506 shows another embodiment of predicted trajectories. In some examples, the predicted trajectory 512 and a predicted trajectory 518 can be output by the prediction component 230 in accordance with the techniques discussed in FIG. 3, as well as throughout this disclosure. That is, the example 506 can represent the predicted trajectories based at least in part on one or more heat maps, which can include multiple trajectories with probabilities, rankings, or weights associated with individual trajectories. In some instances, the individual predicted trajectories 512 and 518 can be associated with individual uncertainties.

The example 508 illustrates "raw" heat maps 136, 138 and 140 that can be output by the prediction component 230 for use in the planning component 224. That is, in some instances, the prediction component 230 can output the heat maps 136, 138, and 140 in addition to or instead of outputs illustrated by the examples 504 and 506.

Thus, the illustration 500 demonstrates the flexible outputs of the prediction component 230 discussed herein, whereby an output format of the predicted output(s) 502 is based on a particular implementation of the system.

Figure 6:
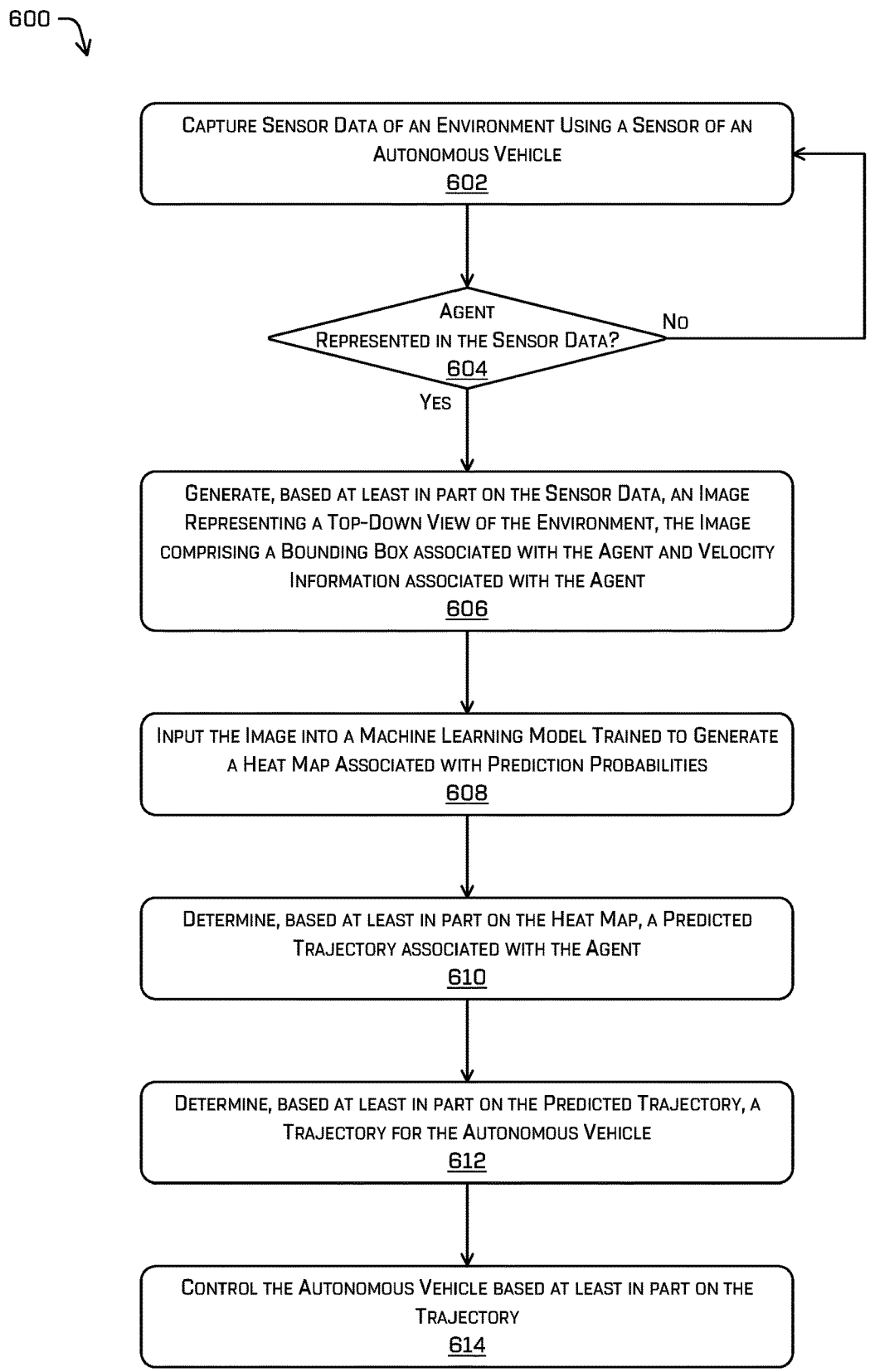
FIG. 6 depicts an example process for generating predicted trajectories based at least in part on a top-down representation of an environment including information associated with an agent in the environment, in accordance with embodiments of the disclosure.

FIGS. 1, 3, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 depicts an example process 600 for generating predicted trajectories based at least in part on a top-down representation of an environment including information associated with an agent in the environment, in accordance with embodiments of the disclosure. For example, some or all of the process 600 can be performed by one or more components in FIG. 2, as described herein. For example, some or all of the process 600 can be performed by the vehicle computing device(s) 204 and/or the computing device(s) 242.

At operation 602, the process can include capturing sensor data of an environment using a sensor of an autonomous vehicle. For example, the sensor data can include data captured by one or more of a LIDAR sensor, a RADAR sensor, an image sensor, a time of flight sensor, a SONAR sensor, and the like. In some examples, the operation 602 can include capturing sensor data using a plurality of sensors and fusing or combining the sensor data into a detail and informative representation of the environment.

At operation 604, the process can include determining whether an agent is represented in the sensor data. For example, the operation 604 can include inputting at least a portion of the sensor data into a detector or providing the data to a detection or perception algorithm (e.g., the perception component 222) to identify one or more agents in the environment. Examples of agents include, but are not limited to, a vehicle, a pedestrian, a bicycle, a skateboard, a scooter, an animal, and the like. If no agent is detected (e.g., "no" in the operation 604) the process can return to the operation 602 to captured additional sensor data. If an agent is detected (e.g., "yes" in the operation 604

At operation 606, the process can include generating, based at least in part on the sensor data, an image representing a top-down view of the environment, the image comprising a bounding box associated with the agent and velocity information associated with the agent. In some examples, the image can comprise acceleration information (instead of or in addition to the velocity information).

Additional information that can be included in the image can include, but is not limited to: a color of the bounding box representing a classification of the agent associated with the bounding box, a velocity of the bounding box in an x-direction and a y-direction (where a velocity can be represented as a vector in one channel or in multiple channels, with the x-velocity and the y-velocity represented in different channels), an acceleration of the agent in an x-direction and a y-direction (where an acceleration can be represented as a vector in one channel or in multiple channels, with the x-acceleration and the y-acceleration represented in different channels), a blinker status associated with the bounding box (e.g., left-turn, right-turn, braking, reverse, hazards, no lights, etc.), road network information (e.g., semantic labels indicating lanes, crosswalks, stop signs, intersections, traffic lights, and the like), traffic light status (e.g., red light, yellow light, green light, etc.), and the like. In such an image, semantic information about the agent and the environment may be encoded in one or more channels as discussed in detail herein.

As discussed herein, the operation 606 can include generating a plurality of images representing behavior of the agent in the environment over time.

At operation 608, the process can include inputting the image into a machine learning model trained to generate a heat map associated with prediction probabilities. In some examples, the operation 608 can include generating a plurality of channels based on the image and inputting the plurality of channels into the machine learning model. In some examples, the image can be input into the machine learning model without generating a plurality of channels. Additional details of the machine learning model, the heat map, and the prediction probabilities are discussed throughout the disclosure.

At operation 610, the process can include determining, based at least in part on the heat map, a predicted trajectory associated with the agent. Additional details of determining a predicted trajectory based at least in part on the heat map are discussed above in connection with FIG. 3, as well as throughout the disclosure.

At operation 612, the process can include determining, based at least in part on the predicted trajectory, a trajectory for the autonomous vehicle. In some examples, the trajectory based on the predicted trajectory can represent a safer and/or smoother trajectory compared to a trajectory generated without the predicted trajectory, as the planning component 224 generating the trajectory can anticipate more closely the actions of entities proximate to the autonomous vehicle.

At operation 614, the process can include controlling the autonomous vehicle based at least in part on the trajectory. In some examples, the operation 614 can include controlling one or more of steering, braking, and/or acceleration of the autonomous vehicle to traverse through the environment.

Figure 7:
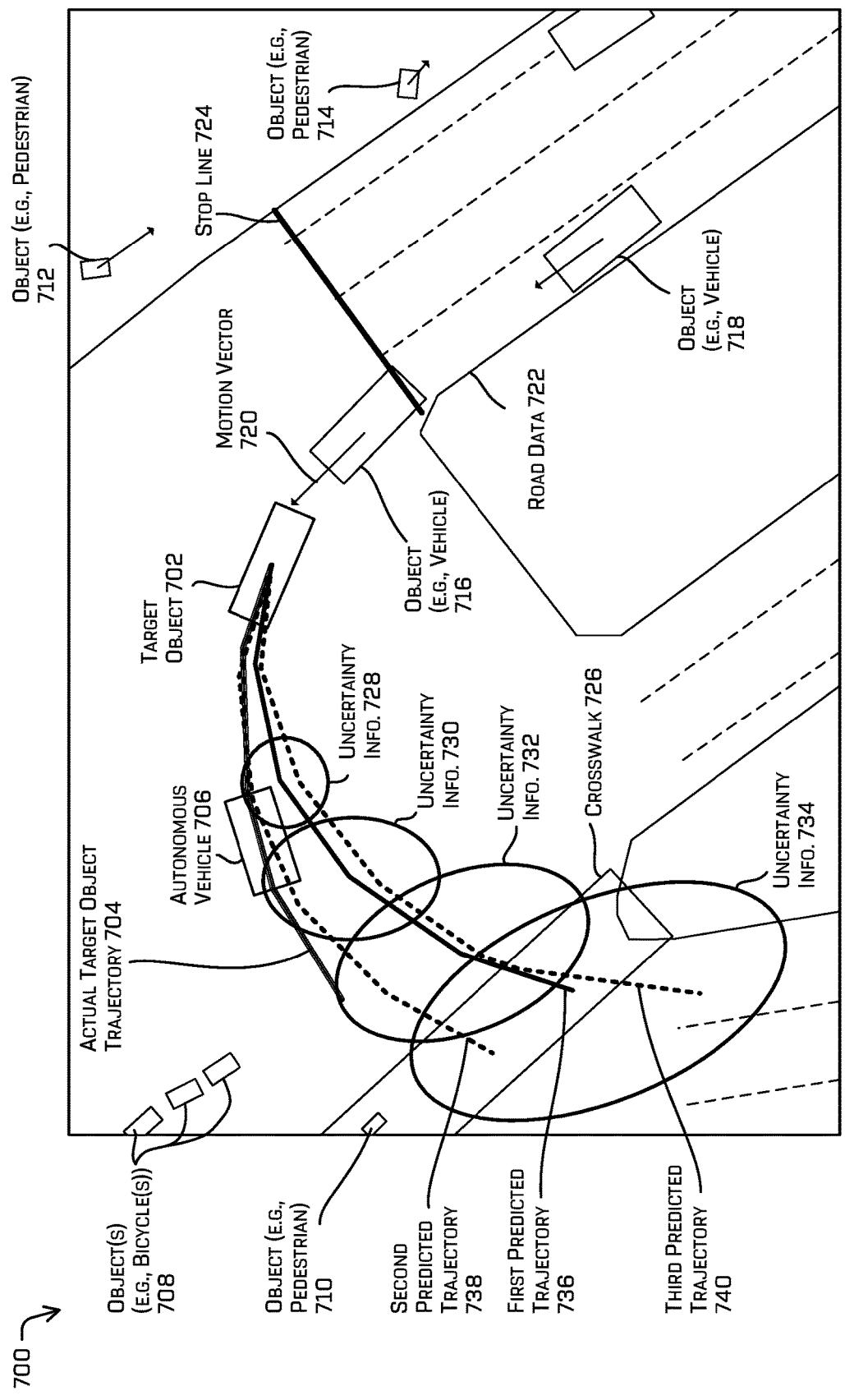
FIG. 7 is an illustration of future state prediction of an entity in a top-down scene as output by a prediction system, in accordance with examples of the disclosure.

FIG. 7 is an illustration 700 of future state prediction of an entity in a top-down scene as output by a prediction system, in accordance with embodiments of the disclosure.

A target object 702 is illustrated in an environment. In some examples, the target object 702 (e.g., also referred to as a target vehicle or a target entity) can be represented in a top-down scene with a unique color, such as red. The illustration 700 represents predictions associated with the target object 702. In some examples, the target object 702 can be referred to as a target entity or target agent. In some examples, the target object 702 can represent a vehicle, a pedestrian, a bicyclist, an animal, and the like.

An actual target object trajectory 704 illustrates a trajectory of the target object 702 as actually traveled by the target object 702. For example, an autonomous vehicle 706 in the environment may have captured data associated with the environment for the purposes of the predictions, as discussed herein. Though examples described below are referred to as having a specific color, it is understood that any such color is contemplated and, in at least some cases, is merely illustrative of a different channel of a multi-channel image whereby each channel encodes a different piece of information about the scene. Additionally, or alternatively, any object information (classification, speed, acceleration, etc.) may be encoded by a representative channel.

The environment further illustrates objects 708, which may represent bicycles. In some examples, bicycles can be represented in the top-down scene with a unique color, such as orange.

Objects 710, 712, and 174 can represent pedestrians in the environment. In some examples, pedestrians can be represented in the top-down scene with a unique color, such as magenta.

Objects 716 and 718 can represent other vehicles in the environment. In some examples, vehicle can be represented in the top-down scene with a unique color, such as blue. In some examples, a motion vector 720 can be associated with the object 716. The motion vector 720 can represent a speed, velocity, and/or acceleration of the object 716, and can be scaled proportional to other velocities of objects. In some examples, motion vectors can be represented in the top-down scene with a unique color, such as orange. Although not expressly number, individual objects it the environment may include motion vectors.

Semantic map information is represented by road data 722, a stop line 724, a crosswalk 726, and the like. In some examples, the semantic map information may include, but is not limited to, centerlines of road segments, lanes, surface materials, buildings, traffic lights, etc.

Uncertainty information 728, 730, 732, and 734 represents prediction probabilities associated with the target object 702 at times in the future. In some examples, the uncertainty information 728, 730, 732, and 734 each represent an ellipse showing one standard deviation of uncertainty. In some examples, the uncertainty information 728, 730, 732, and 734 is associated with the first predicted trajectory 736, which represents a most-likely trajectory for the target vehicle 702 to follow in the environment.

The illustration 700 also shows a second predicted trajectory 738 and a third predicted trajectory 740. The although not illustrated, each of the predicted trajectories 738 and 740 can be associated with uncertainty information similar to the uncertainty information 728, 730, 732, and 734. The techniques here are not limited to determining one, two, or three predicted trajectories, and any number of predicted trajectories can be determined.

Input Representation

Figure 8:
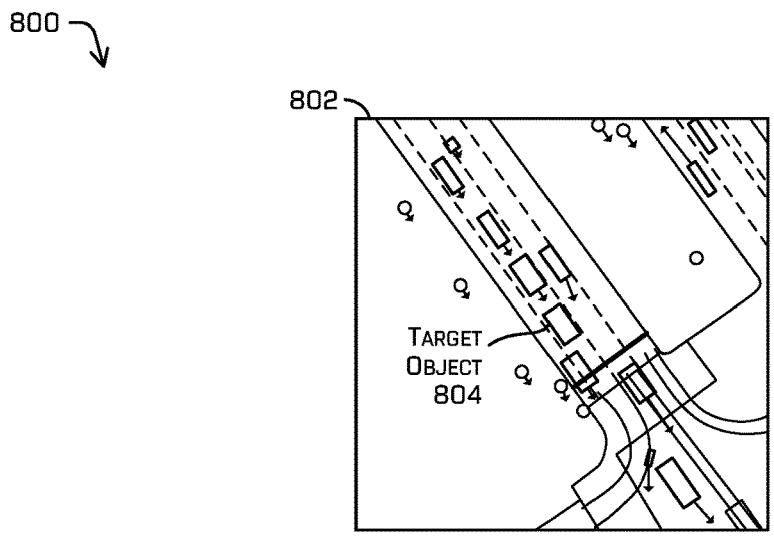
FIG. 8 is an illustration entity and world state information, in accordance with examples of the disclosure.
Figure 8:
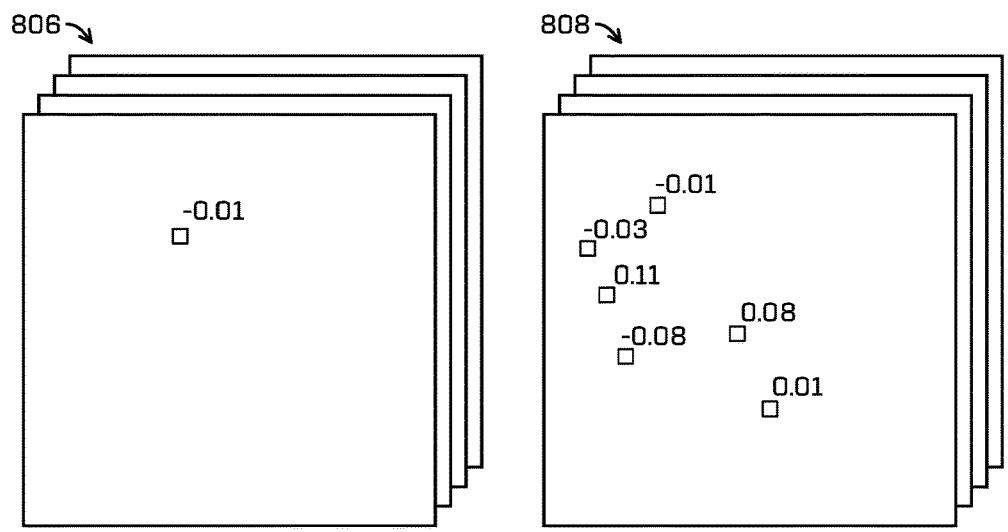
Figure 8:
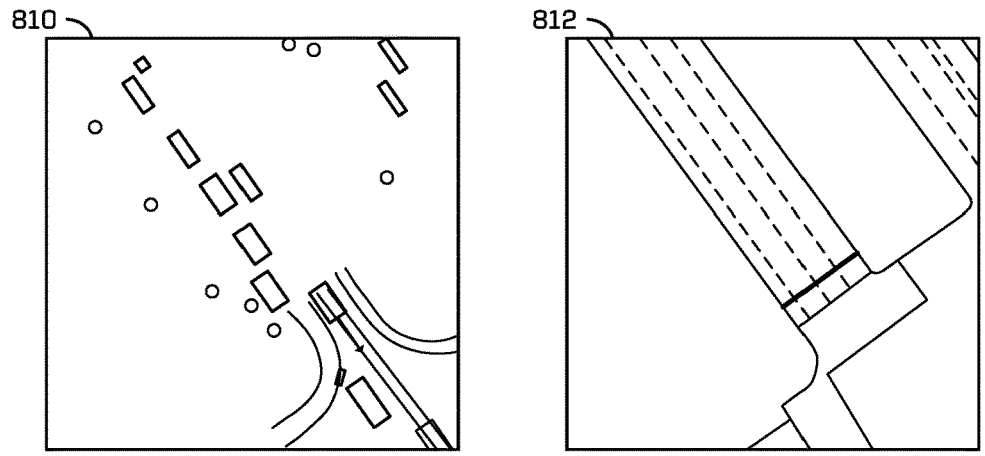
Figure 9A:
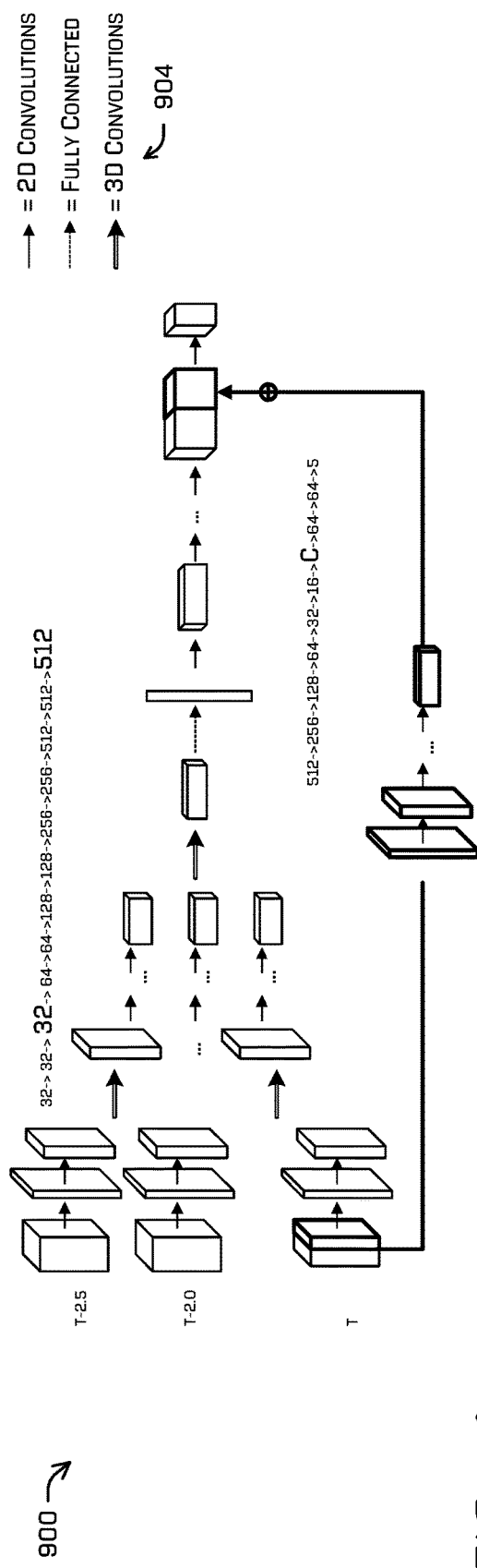
FIG. 9A is an illustration of a first architecture for a model to output predictions, in accordance with examples of the disclosure.
Figure 9B:
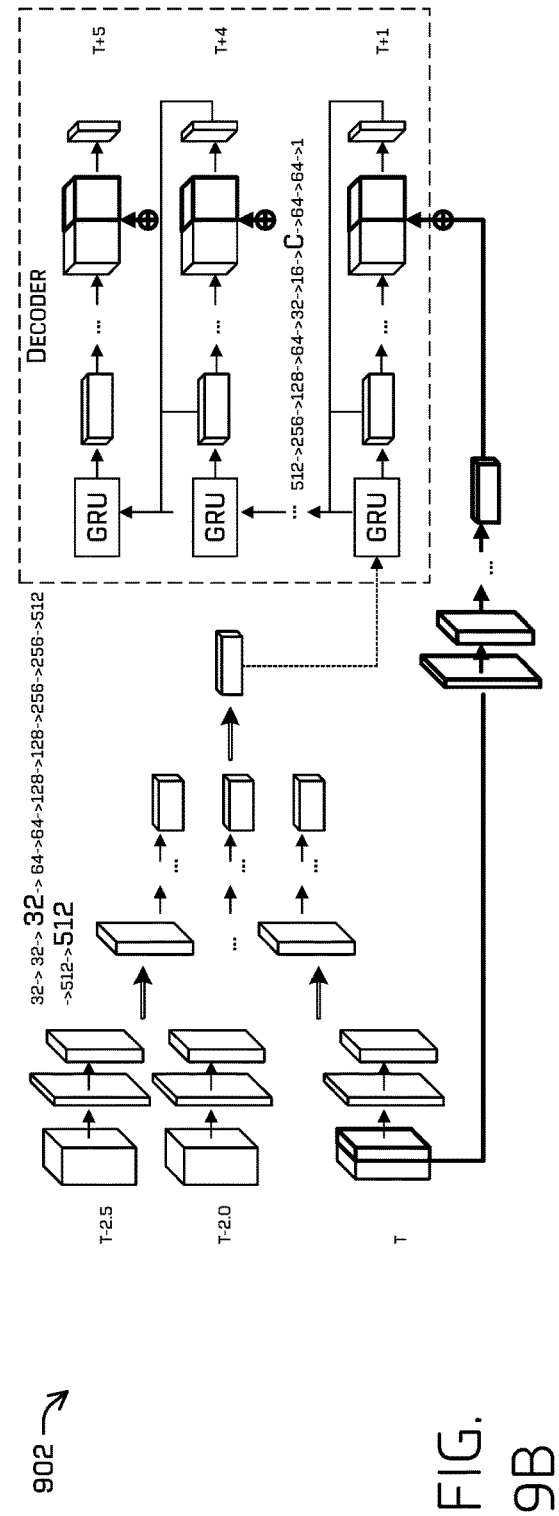
FIG. 9B is an illustration of a second architecture for a model to output predictions, in accordance with examples of the disclosure.

Prediction techniques can include: 1) an input representation of an entity and its surrounding world context (e.g., as illustrated in the images 118, 120, and 122 of FIG. 1, and as illustrated in example 802 in FIG. 8); 2) a neural network (e.g., as illustrated in FIG. 9A or 9B) mapping past behavior and present world representation to future behavior; and 3) one of several possible output representations (e.g., as illustrated in FIGS. 5, 7, 10, and 11) of future behavior amenable to integration into a robot planning system, for example.

As noted above, the prediction techniques can be based at least in part on road network data. Such road network data can include lane and junction extent and connectivity, as well as other relevant features for driving, such as crosswalks, light-lane permissibility, stop and yield lines, and the like. In some instances, road network data can be mapped to geometric primitives and can be rendered as a top-down grid/scene representation as a multichannel image (such as an RGB image) with fixed colors for each element type, as discussed herein.

In some examples, information associated with the road network can be represented as a tensor. In some examples, a tensor can comprise a mathematical object analogous to but more general than a vector, wherein data is represented as an array of components that can be functions of the coordinates of a space.

In some examples, a rendered tensor of static road information is denoted as R of size W×H×3 (e.g., in those examples in which a single RGB (3-channel) image is used to encode the environmental information). In some examples, traffic light can be added to a tensor of perception information per road junction/lane masking, as discussed herein.

Data representing objects in an environment can be received from the perception component 222.

For each timestep t, measured quantities for each tracked entity i include 2D position $x_i^t$, velocity $v_i^t$, and acceleration $a_i^t$.

The perception component 222 can determine state information uncertainty in the form of covariance matrices, which can be included in the processing via covariance norms $\|\Sigma_{i\{x,v,a\}}^t\|_F$. In some instances, feature dimensions can be scaled by an estimate of a 99$^{th}$ percentile magnitude estimation such that features are associated with comparable dynamic ranges near [−1, 1].

In some instances, a tensor for a target entity i (e.g., the target entity 702) at any timestep t can be denoted $E_i^t$, which may include a channel for each state dimension above, and may encode the scalar at the center of the entity position, which is in spatial correspondence with road graph tensor R. To model entity interactions, operations include aggregating some or all entities (e.g., the objects 706, 708, 710, 712, 714, 716, and/or 718) in a tensor encoded in a same or similar way: $E_{-i}^t = \Sigma_{j \neq i} E_j^t$ (which is to say a tensor including all information except for information relating to entity, i). In some examples, such tensors can be represented as a size W×H×7, though any number is contemplated.

In some examples, additional scene context can be encoded as an RGB image $D^t$ of size W×H×3. In some examples, such additional scene context can include oriented bounding boxes of some or all entities in a scene (e.g., as illustrated in FIG. 7). In some examples, bounding boxes can be colored by class type (e.g., one of cyclist, vehicle, pedestrian, etc.). In some examples, the scene context can include a rendering of traffic light permissibility in junctions, such that traffic light context can be rendered by masking road connections that exhibit each permissibility. In some examples, junction permissibility can include, but is not limited to permitted (e.g., green light), yield (e.g., unprotected), or prohibited (e.g., red light).

FIG. 8 is an illustration 800 of entity and world state information, in accordance with embodiments of the disclosure.

An example 802 illustrates an example scene of an environment. A target object 804 (also referred to as a target entity or a target agent) is illustrated in the example 802.

An example 806 illustrates a target entity state, which can be represented as:

$$E_i^t = [v_i^t, a_i^t, \|\Sigma_{i\{x,v,a\}}^t\|_F], \qquad (1)$$

such that the entity state comprises a current velocity and acceleration, as well as a covariance norm of position, velocity, and acceleration.

An example 808 illustrates states of other entities in an environment, which can be represented as:

$$E_{-i}^t = \Sigma_{j \neq i} E_j^t. \qquad (2)$$

An example 810 illustrates a dynamic context $D^t$, which, though illustrated as a single image may have multiple channels represented by different colors.

An example 812 illustrates a road network R.

In some examples, some or all inputs at timestep t and target entity i (e.g., the target entity 804) can be concatenated (e.g., in a third channel dimension) into a tensor represented as:

$$C_i^t = [E_i^t, E_{-i}^t, D^t, R] \qquad (3)$$

which can correspond to a size W×H×20. Here, C may comprise a concatenation of the entity state, all other entity states, the dynamic context, and the road network. In some instances, operations can include concatenating some or all $C_i^t$ over past history along a temporal dimension. A coordinate system can be fixed or otherwise determined for a static R for some or all timestamps by centering a reference frame (e.g., illustrated in the example 802) at a position associated with the target entity 804 at a time of prediction (e.g., t=0).

In some cases, the example scene 802 can represent a variety of information. For example, a top-down representation can represent vehicle brake lights, headlights, and/or turn signals, person pose and/or gestures, audio cues, road surface features (e.g., frictional coefficients), and the like. Such additional information can be represented as any number of additional state channel dimensions.

Output Representation

Objects of the present disclosure include representing future states of an entity, which should be: 1) a probability distribution over the entity state space at each timestep; 2) multimodal (e.g., representing a plurality of possible trajectories) to cover a diversity of possible implicit actions an entity might take (e.g., which way an entity is likely to travel through a junction with a plurality of possibilities); and 3) one-shot, meaning the ability to predict full trajectories (and/or time sequences of state distributions) without iteratively applying a recurrence step. Such objects can be provided by the techniques for generating output distribution representations, as discussed herein.

In some examples, the techniques discussed herein can be formulated as a sequence-to-sequence generation problem. For example, for a time instant t, past scenes represented as $X=\{C_{t-l+1}, C_{t-l+2}, \ldots, C_t\}$ can be observed to predict future xy-displacements from time t, denoted as $Y=\{(x_{t+1}, Y_{t+1}), (x_{t+2}, Y_{t+2}), \ldots (x_{t+m}, Y_{t+m})\}$ for a target entity (e.g., 804), where l and m are the time range limits for past observations and future time horizon to be considered.

Aspects of modeling P(X|Y) are discussed herein.

Parametric Regression Output with Uncertainty

In some examples, operations can include determining (e.g., predicting) sufficient statistics for a bivariate Gaussian for each future position $(x_t, y_t)$: the mean $\mu_t=(\mu_{x,t}, \mu_{y,t})$, standard deviation $\sigma_t=(\sigma_{x,t}, \sigma_{y,t})$, and spatial correlation scalar $\rho_t$. Of course, other parameterizations (e.g., body-centric) are considered. In some examples, while training a machine learning model to output prediction probabilities, the model can attenuate the effect of outlier trajectories in the training data to have a smaller effect on the loss (e.g., L1 (e.g., least absolute deviations), L2 (e.g., least squares error), softmax, etc.).

In some examples, a model can be trained to predict log standard deviation $s_t$=log $\sigma_t$, as it may be associated with a larger numerically-stable range for optimization. In some examples parameters can be learned via maximum likelihood estimation:

$$\log P(Y|X) = \Sigma_{t'=t+1}^{t+m} \log p(x_{t'}, y_{t'}|\mu_{t'}, s_{t'}, \rho_{t'}) \quad (4)$$

where p is the density function of a bivariate Gaussian parameterized by $\mathcal{N}(\mu_t, \sigma_t, \rho_t)$.

Some operations may include a multi-modal regression with uncertainty. For example, techniques can include predicting up to k different Gaussian trajectories, indexed by $(\mu^i, s^i, \rho^i)$, and a weight $w^i$ associated with the probability of a trajectory, $$P(Y|X) = \Sigma_{i=1}^k w_i P(Y|\mu^i, s^i, \rho^i) \quad (5)$$

However, aspects of (1) exchangeability and (2) collapse of modes are discussed with respect to the probability of a trajectory.

For exchangeability, in some examples an output is invariant to permutations, namely $\{(\mu^i, s^i, \rho^i)\}=\{(\mu^{\pi(i)}, s^{\pi(i)}, \rho^{\pi(i)})\}$ for some permutation $\pi$ of $\{1, 2, \ldots, k\}$.

For collapse of modes, in some examples, consider a mixture of two distribution with equal covariance, or $Y \sim \frac{1}{2} \mathcal{N}(y^1, \sigma^2) + \frac{1}{2} \mathcal{N}(y^2, \sigma^2)$. In some examples, if $y^i$ is not far enough, specifically $|y^1-y^2| \leq 2\sigma$, then the mixture has a single mode at $\frac{1}{2}(y^1+y^2)$, and thus can be approximated by a single Gaussian parameterized by $\mathcal{N}(\frac{1}{2}(y^1+y^2), \sigma^2+\frac{1}{2}(y^1-y^2)^2)$. In some instances, this allows the learning to center the k Gaussians on a single state with large variance ("mode collapse"), with nothing to encourage the modes to be well-separated.

In some examples, inspired by Latent Dirichlet Allocation (LDA), a latent variable z can be introduced such that $(\mu^i, s^i, \rho^i)$ are identifically and independently distributed conditioned on z, $$P(Y|X) = \Sigma_{i=1} P(z_i|X) P(Y|\mu^i, s^i, \rho^i, z_i) \quad (6)$$

where $(\mu^i, s^i, \rho^i)$ is some fixed function of both the input X and latent variable z, resolving the mode exchangeability problem. In some instances, to address mode collapse, z can be chosen to be k-dimensional with small k, and the model is encouraged through the learning operations to output a diverse set of modes.

In some examples, a prediction probability can be conditioned on the latent variable (e.g., z) to reduce a dimensionality of data. In some examples, a latent variable can be used to disambiguate between Gaussian probabilities. In some examples, such latent variables can represent variables that are not directly observed but that are inferred from other variables that are directly observed.

In some examples, to train such a model, a conditional variational autoencoder (CVAE) approach can be used, and P(z|X) can be modeled as a categorical distribution, using Gumbell-Softmax reparameterization to sample and back-propagate gradients through z. In some examples, P(z|X) can be used as a discrete, k-Gaussians mixture distribution over state at future timesteps. In some examples, such a method can be (loosely) referred to as "GMM-CVAE".

Non-Parametric Output Distributions

In some examples, prediction probabilities can be output as parametric forms (e.g., a Gaussian output) or as an occupancy grid map (e.g., a heat map). In some examples, an occupancy grid map can comprise an output grid for each future modeled timestep, wherein a location within the grid can comprise a probability of a corresponding output state.

In some examples, the occupancy grid map trades off the compactness of the parametric distributions with arbitrary expressiveness, such that non-parametric distributions (e.g., the occupancy grid map) can capture non-elliptical uncertainty and/or a variable number of modes at each timestep.

Further, in some instances, non-parametric distributions offer alternative ways of integrating information into a robot planning system. For example, non-parametric distributions may be readily combined (e.g., aggregated) with other non-parametric distributions. In some cases, fast approximate integration can be utilized to calculate or otherwise determine a collision risk. Examples of such fast approximate integration are discussed in U.S. patent application Ser. No. 16/206,877, filed Nov. 30, 2018. Application Ser. No. 16/206,877 is herein incorporated by reference, in its entirety.

In the context of an occupancy grid map, any future state can be discretized to two-dimensional grid coordinates $(i_t, j_t)$. Training a model to output an occupancy grid map can include maximizing a log-likelihood on predicted grid maps $g_t[i,j] \equiv P(Y=(i_t, j_t)|X)$, which represent discrete distributions over the discretized state space at each timestep. In some examples, a training loss can correspond to a sum of cross-entropy losses for $t' \in [t+1, t+m]$.

In some examples, one or more discrete trajectories can be extracted from the occupancy grid maps, as discussed herein.

Let $\xi_t=(i_t, j_t)$ be a sampled discretized state at time t, and $\xi=\{\xi_{t+1}, \ldots, \xi_{t+m}\}$ be a sampled trajectory. In some examples, a pairwise-structured score for a sampled trajectory can be defined as:

$$s(\xi) = \Sigma_{t'=t+1}^{t+m} \log P(Y=\xi_{t'}|X) - \lambda \cdot \phi(\xi_{t'}, \xi_{t'-1}), \quad (7)$$

where $\phi(\cdot, \cdot)$ can be an arbitrary score function of the compatibility of consecutive states. In some examples, a hard-soft constraint cost can be designated as:

$$\phi(\xi_{t'}, \xi_{t-1}) = \begin{cases} \|\xi_t - v(\xi_{t-1})\|_2^2 & \text{if } \|\cdot\|_\infty \leq 5 \\ \infty & \text{otherwise} \end{cases}, \quad (8)$$

where $\lambda$ can represent a configurable parameter. In some examples, $\lambda$ can be set as $\lambda=0.1$ and $v(\xi_t)$ can represent the state transitioned to under a constant velocity motion from time t to t+1.

In some examples, this can serve as a Gaussian next-state prior centered on a constant velocity motion model, with a cut-off disallowing unreasonable deviations.

In some examples, the techniques discussed herein can represent an instance of a pairwise graphical model, whereby the operations can include solving for a trajectory $\xi^* = \arg\max_\xi s(\xi)$ efficiently using a max-sum message passing dynamic program.

Beyond $\xi^*$, the operations discussed herein comprise extracting a set of trajectories which satisfy:

$$\{\xi^{*1}, \ldots, \xi^{*k}\} = \underset{\{\xi^1, \ldots, \xi^k\}}{\arg\max} \sum_{i=1}^{k} s(\xi^i) \qquad (9)$$

$$\text{subject to: } \|\xi^i - \xi^j\| > 1 \qquad (10)$$

The extracting discussed herein is directed to determining a set of k trajectories which maximizes $s(\cdot)$ but that are sufficiently far from each other, for some norm $\|\cdot\|$. This can be solved or otherwise determined iteratively by extracting trajectories by solving $s(\xi)$ and then masking regions of $g_t$ (e.g., as described above with respect to FIG. 3) based at least in part on (e.g., to guarantee) the distance constraint on the next optimization of $s(\xi)$ for the next trajectory.

Network Model

FIGS. 9A and 9B illustrate example architectures of models to output predictions, in accordance with embodiments of the disclosure. A first architecture is illustrated in FIG. 9A as an architecture 900, and a second architecture is illustrated in FIG. 9B as an architecture 902. A guide 904 defines various connections of components in the architectures 900 and 902.

In some examples, the techniques discussed herein use an encoder-decoder architecture for modeling, wherein the encoder maps the four-dimensional input tensor (e.g., time× space×channels) into an internal latent representation, and wherein the decoder uses the representation to model an output distribution over states at a predetermined set of future time offsets (e.g., 1 second in the future, 2 seconds in the future, ..., n seconds in the future, etc.).

With respect to an encoder, aspects include a convolutional neural network (CNN) backbone of two-dimensional (2D) convolutions (e.g., similar to VGG16), on each three-dimensional tensor of an input sequence. In some examples, temporal convolutions achieve better performance and significantly faster training than a recurrent neural network (RNN) structure. In some examples, to incorporate a temporal dimension, two three-dimensional convolutions can be added to an architecture. In some examples, a first 3D convolution can be added towards the beginning of the backbone, and in some examples, a second 3D convolution can be added towards the end of the backbone. In some examples, the first 3D convolution can be associated with a kernel size 3×3×3, and in some examples, the second 3D convolution can be associated with a kernel size 4×3×3. In some examples, the first and second 3D convolutions may or may not use padding.

With respect to a decoder, two example architectures are discussed herein: 1) "one-shot" prediction of some or all of the output sequence, and 2) an RNN-decoder that emits an output distribution at a single timestep at each inference recurrence step.

The first architecture 900 is an example "one-shot" decoder illustrated in FIG. 9A, while the second architecture 902 is an example RNN-decoder illustrated in FIG. 9B.

In some examples, with respect to the first architecture 900, a one-shot decoder uses a two-layer network to regress some or all of the distribution parameters at once, or a two-dimensional convolutional-transpose network with channels equal to a sequence length.

In some examples, with respect to the second architecture 902, an RNN-decoder uses a single gated recurrent unit (GRU) cell, whose hidden output is used to regress the true output, which is then fed in as next input.

For an occupancy grid map output representation, a semantic road map R is fed through a separate, shallow CNN tower (16→16→1 filters), yielding a spatial grid. This grid intuitively acts as a prior heatmap of static information that is appended to the decoder before applying softmax. In some examples, this architecture allows the model to easily penalize positions that correspond to obstacles and non-drivable surfaces.

Example Implementation Details

In some examples, an amount of past history, l, can be chosen as l=2.5 seconds. In some examples, predictions can be generated for m=5 seconds in the future.

In some examples, to reduce a problem space complexity, techniques include subsampling the past at 2 Hz and predicting future control points at 1 second intervals. In some examples, input frames can correspond to 128×128 pixels, while the input frame can correspond to a real-world environment of 50×50 m². In some examples, an output grid size can be set to 64×64 pixels, so that each pixel in the output grid can correspond to 0.78 m² of the environment.

In some examples, for sampling a diverse trajectory set, a norm (e.g., as discussed above with respect to Equation 10) can correspond to $$\left\| \text{diag}\left(\left[0, \frac{1}{3}, \frac{1}{3}, \frac{1}{5}, \frac{1}{5}\right]\right) x \right\|_\infty,$$

in pixel coordinates.

With respect to a model, to conserve memory in a CNN backbone, a separable 2D convolutions can be used for most of the backbone with stride 2 (e.g., see FIGS. 9A and 9B). In some examples, a model can use batch-normalization layers to deal with the different dynamic ranges of our input channels (e.g., binary masks, RGB pixel values, m/s, m/s²). In some examples, techniques include using CoordConv for some or all 2D convolutions in the encoder, which may aid in mapping spatial outputs to regressed coordinates. In some examples, a 512-dimensional latent representation can be selected as a final layer of the encoder, and for some or all GRU units.

With respect to training, an initial learning rate of $10^4$ can be used in conjunction with an Adam optimizer. In some instances, after a convergence is reached with the Adam optimizer, training can include using stochastic gradient descent (SGD) with a learning rate of $10^{-5}$.

In some examples, for training Gaussian parameters, pretraining a model using mean-squared error can produce better predicted trajectories.

In some examples, models can be trained on an GPU such as an NVIDIA Maxwell Titan X GPU with Tensorflow Keras.

Figure 10:
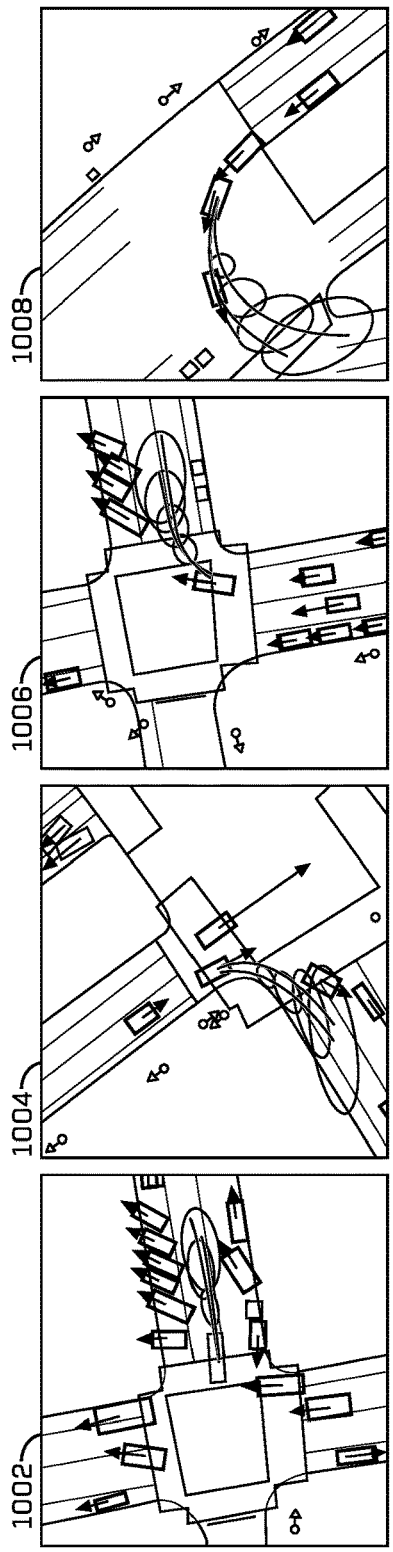
FIG. 10 is an illustration of various predicted trajectories as output by a prediction system, in accordance with examples of the disclosure.

FIG. 10 is an illustration 1000 of various predicted trajectories as output by a prediction system, in accordance with embodiments of the disclosure.

Examples 1002, 1004, 1006, and 1008 illustrate Gaussian regression and GMM-CVAE trajectories, with uncertainty depicted as ellipses. In some examples, uncertainty ellipses can be larger when the target entity is turning than when the target entity is continuing straight, and often follow the direction of velocity. That is, in some examples, when a target object is turning, uncertainty ellipses can be stretched in a direction of the turn, as illustrated in examples 1004, 1006, and 1008. In the GMM-CVAE example, different samples can result in prediction(s) that a target entity will turn into different lanes in a junction.

Figure 11:
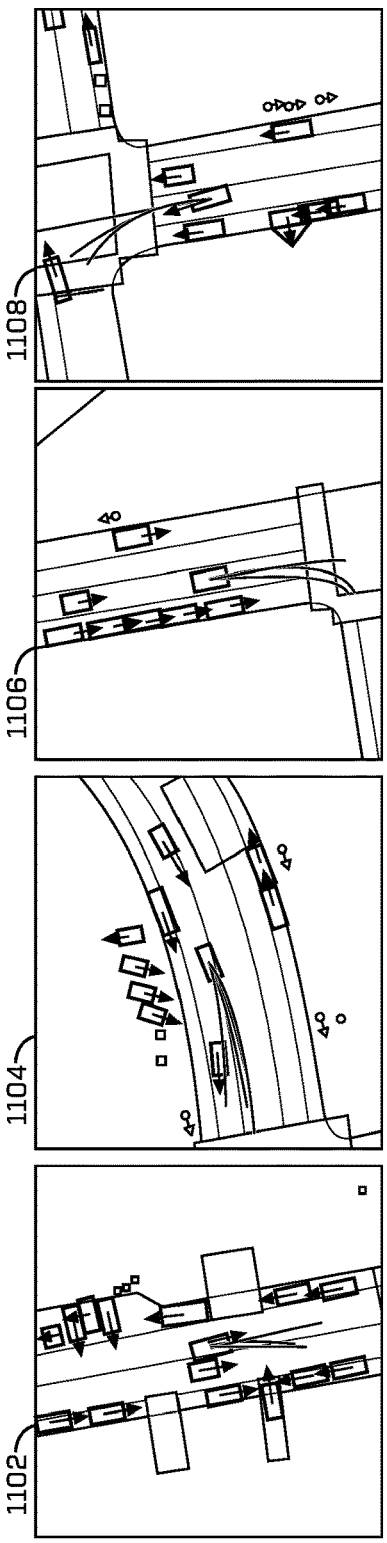
FIG. 11 is an illustration of various predicted trajectories as output by a prediction system, in accordance with examples of the disclosure.

FIG. 11 is an illustration 1100 of various predicted trajectories as output by a prediction system, in accordance with embodiments of the disclosure.

Examples 1102, 1104, 1106, and 1108 illustrate samples of Grid Map trajectories. In each of the examples 1102, 1104, 1106, and 1108, at least one of the top-5 samples matches the ground truth. Such examples illustrate that the techniques can predict sophisticated behavior such as maneuvering around obstacles and changing lanes.

Figure 12:
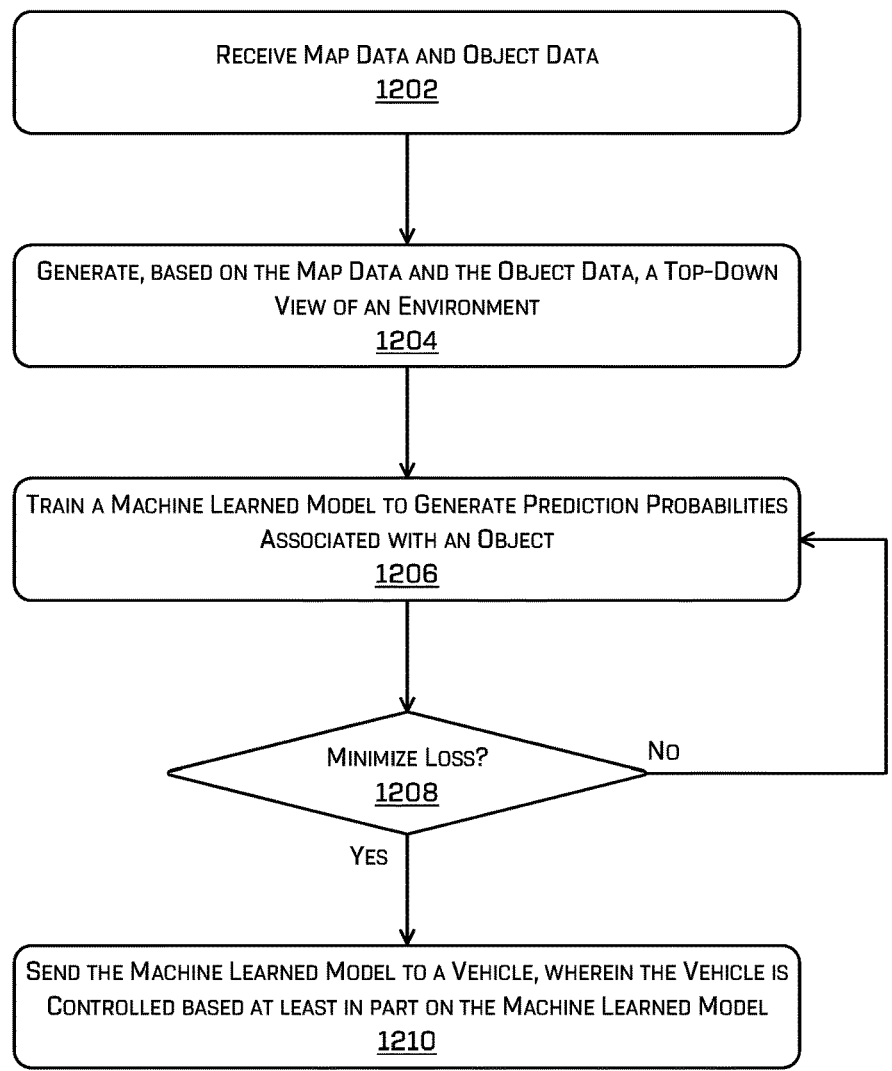
FIG. 12 depicts another example process for generating predicted trajectories based at least in part on a top-down representation of an environment including information associated with an agent in the environment, in accordance with examples of the disclosure.

FIG. 12 depicts another example process for generating predicted trajectories based at least in part on a top-down representation of an environment including information associated with an agent in the environment, in accordance with embodiments of the disclosure. For example, some or all of the process 1200 can be performed by one or more components in FIG. 2, as described herein. For example, some or all of the process 1200 can be performed by the vehicle computing device(s) 204 and/or the computing device(s) 242.

At operation 1202, the process can include receiving map data and object data. In some examples, map data can represent an environment in the object data associated with an object was captured. In some examples, map data can comprise lane information, crosswalk information, stop line information, and the like. In some examples, object data can include information representing the object captured by one or more sensors. In some examples, the object data can be based at least in part on image data, lidar data, time of flight data, radar data, sonar data, and the like, by an autonomous vehicle traversing the environment. In some examples, the object data can comprise bounding box information, velocity information, captured trajectory information, and the like.

At operation 1204, the process can include generating, based on the map data and the object data, a top-down view of an environment. In some examples, the top-down view can comprise image data, which may be represented by a plurality of channels. In some examples, information associated with a particular object can be represented in an individual channel of the plurality of channels. In some instances, the image data can represent semantic map information, bounding box information associated with objects, and the like. In some examples, the operation 1204 can include generating a plurality of images representing the environment over time (e.g., 2 seconds in the past, 1 second in the past, at a current time, etc.). Examples of the top-down views are discussed throughout this disclosure.

At operation 1206, the process can include training a machine learned model to generate prediction probabilities associated with an object. In some instances, the machine learned model can comprise a convolutional neural network, which may include a "one-shot" architecture (e.g., FIG. 9A) or an RNN-decoder (e.g., FIG. 9B). In some examples, training the machine learned model can include generating a predicted position of the object based on the top-down views and comparing the predicted position to an actual position of the object as captured in the environment. In some examples, training can be associated with a learning rate of $10^4$ and an Adam optimizer. When the Adam optimizer converges, training can be based in part on a learning rate of $10^{-5}$ and a stochastic gradient descent.

At operation 1208, the process can include minimizing a loss. In some examples, the operation 1208 can include minimizing an L2 distance between a prediction output by the machine learned model and a ground truth associated with the actual position or trajectory associated with the object. In some instances, the operation 1208 can include training until the loss is below a threshold value, until a number of training iterations have been performed, until a change in loss over time is less than a threshold amount, and the like.

If the loss is not minimized (or substantially minimized), the process can return to the operation 1206 so that the machine learned model can continue to be trained. If the loss is minimized (or is substantially minimized), the process can continue to operation 1210.

At operation 1210, the process can include sending the machine learned model to a vehicle, wherein the vehicle is controlled based at least in part on the machine learned model. For example, the vehicle may be an autonomous vehicle. When the autonomous vehicle traverses an environment, the autonomous vehicle may capture sensor data about an environment to predict trajector(ies) associated with objects in the environment, and can generate one or more trajectories for the autonomous vehicle to follow based on the predicted trajector(ies). For example, the autonomous vehicle can generate a trajectory to minimize a risk of collision based on the predicted trajector(ies) generated as discussed herein.

Example Clauses

A: A system comprising: one or more processors; and one or more computer-readable media storing instructions executable by the one or more processors, wherein the instructions, when executed, cause the system to perform operations comprising: capturing sensor data of an environment using at least one sensor of an autonomous vehicle; generating, based at least in part on the sensor data, an image representing a top-down view of the environment, the image comprising a bounding box associated with a vehicle and velocity information associated with the vehicle, the vehicle being separate from the autonomous vehicle; inputting the image into a machine learning model trained to generate a heat map associated with prediction probabilities of possible locations associated with the vehicle; determining, based at least in part on the heat map, a predicted trajectory associated with the vehicle; and determining, based at least in part on the predicted trajectory, a trajectory for the autonomous vehicle to travel in the environment.

B: The system of paragraph A, wherein determining the predicted trajectory comprises: determining a predicted point based at least in part on a highest probability portion associated with a portion of the heat map and a cost associated with determining the predicted trajectory based at least in part on the predicted point.

C: The system of paragraph B, wherein: the predicted point is a first predicted point; the highest probability portion is a first highest probability portion; the portion is a first portion; the cost is a first cost; the predicted trajectory is a first predicted trajectory; and the operations further comprise: masking, as a masked heat map, a second portion of the heat map associated with the first predicted point, wherein the second portion of the heat map comprises at least the first portion; determining, as a second predicted point, a second highest probability portion associated with a third portion of the masked heat map; and determining a second predicted trajectory based at least in part on the second predicted point and on a second cost associated with determining the second predicted trajectory based at least in part on the second predicted point.

D: The system of any of paragraphs A-C, wherein the image comprises: a first channel representing the bounding box and semantic information associated with the vehicle; and a second channel representing the velocity information associated with the vehicle, and wherein the operations further comprise inputting the first channel and the second channel into the machine learning model.

E: The system of any of paragraphs A-D, wherein the machine learning model comprises: a convolutional neural network (CNN); and a long short-term memory (LSTM) component coupled to the CNN.

F: A method comprising: receiving sensor data of an environment; generating an image representing a top-down view of an agent in the environment, wherein the image includes semantic information associated with the agent or the environment; inputting the image into an algorithm configured to generate a probability distribution associated with a predicted location of the agent; determining, based at least in part on the probability distribution, a predicted trajectory associated with the agent; and controlling an autonomous vehicle based at least in part on the predicted trajectory.

G: The method of paragraph F, wherein the probability distribution is represented as a heat map discretizing portions of the environment, wherein a prediction probability of the probability distribution is association with a portion of the heat map.

H: The method of paragraph G, wherein determining the predicted trajectory comprises: determining a predicted point based at least in part on a highest probability portion of the heat map and a cost associated with the predicted trajectory based at least in part on the predicted point.

I: The method of paragraph H, wherein: the predicted point is a first predicted point; the highest probability portion is a first highest probability portion; the portion is a first portion; the cost is a first cost; the predicted trajectory is a first predicted trajectory; and the method further comprises: masking, as a masked heat map, a second portion of the heat map associated with the first predicted point, wherein the second portion of the heat map comprises at least the first portion; and determining a second predicted point based at least in part on a second highest probability portion of the heat map and a second cost associated with determining a second predicted trajectory based at least in part on the second predicted point.

J: The method of any of paragraphs F-I, wherein the image comprises a plurality of channels, a channel of the plurality of channels comprising at least one of: a location of the agent; an extent of the agent; a bounding box associated with the agent; velocity information associated with the agent; acceleration information associated with the agent; turn indicator status of the agent; map data associated with the environment; or traffic light information associated with the environment.

K: The method of any of paragraphs F-J, wherein: the algorithm is a machine learning model comprising a convolutional neural network trained to generate a heat map representing the probability distribution; and the semantic information comprises a classification of the agent and velocity information associated with the agent.

L: The method of any of paragraphs F-K, wherein controlling the autonomous vehicle based at least in part on the predicted trajectory comprises: generating a trajectory for the autonomous vehicle to follow to traverse the environment; and controlling the autonomous vehicle based at least in part on the trajectory.

M: The method of any of paragraphs F-L, further comprising: capturing, using a sensor on the autonomous vehicle, the sensor data of the environment, wherein the sensor comprises one or more of: a LIDAR sensor; a RADAR sensor; an image sensor; or a time of flight sensor.

N: The method of any of paragraphs F-M, wherein the predicted trajectory is associated with an uncertainty.

O: The method of any of paragraphs F-N, wherein: the sensor data represents the environment at a first time; the probability distribution is a first probability distribution associated with a second time after the first time; the predicted location is a first predicted location; and the algorithm is further configured to generate: a second probability distribution associated with a second predicted location of the agent at a third time after the second time.

P: A non-transitory computer-readable medium storing instructions that, when executed, cause one or more processors to perform operations comprising: receiving sensor data of an environment; generating an image representing a top-down view of an agent in the environment, wherein the image includes semantic information associated with the agent or the environment; inputting the image into an algorithm configured to generate a probability distribution associated with a predicted location of the agent; determining, based at least in part on the probability distribution, a predicted trajectory associated with the agent; and controlling an autonomous vehicle based at least in part on the predicted trajectory.

Q: The non-transitory computer-readable medium of paragraph P, wherein the probability distribution is represented as a heat map discretizing portions of the environment, wherein a prediction probability of the probability distribution is association with a portion of the heat map.

R: The non-transitory computer-readable medium of paragraph Q, wherein determining the predicted trajectory comprises: determining a predicted point based at least in part on a highest probability portion associated with the heat map and a cost.

S: The non-transitory computer-readable medium of paragraph R, wherein: the predicted point is a first predicted point; the highest probability portion is a first highest probability portion; the portion is a first portion; the cost is a first cost; the predicted trajectory is a first predicted trajectory; and the operations further comprise: masking, as a masked heat map, a second portion of the heat map associated with the first predicted point, wherein the second portion of the heat map comprises at least the first portion; and determining a second predicted point based at least in part on a second highest probability portion associated with a third portion of the masked heat map and on a second cost associated with determining a second predicted trajectory based at least in part on the second predicted point.

T: The non-transitory computer-readable medium of any of paragraphs P-S, wherein: the sensor data represents the environment at a first time; the probability distribution is a first probability distribution associated with a second time after the first time; and the probability distribution is generated prior to the second time.

U: A system comprising: one or more processors; and one or more computer-readable media storing instructions executable by the one or more processors, wherein the instructions, when executed, cause the system to perform operations comprising: receiving map data of an environment; receiving object data representing an object in the environment, the object data comprising a captured trajectory of the object and a bounding box associated with the object; generating, based at least in part on the map data and the object data, a multi-channel image representing a top-down view of the environment, the multi-channel image comprising the bounding box associated with the object and velocity information associated with the object; inputting the multi-channel image into a machine learned model; receiving, from the machine learned model, a prediction probability associated with the object; and controlling, based at least in part on the prediction probability, an autonomous vehicle to traverse the environment.

V: The system of paragraph U, wherein the predicted probability comprises a multi-modal Gaussian trajectory.

W: The system of paragraph V, wherein the multi-modal Gaussian trajectory is conditioned on a latent variable.

X: The system of any of paragraphs U-W, wherein the prediction probability comprises an occupancy grid associated with a future time, and wherein a cell of the occupancy grid is indicative of a probability of the object being in a region associated with the cell at the future time.

Y: The system of any of paragraphs U-X, wherein the prediction probability associated with the object is determined as an optimization over pairwise states, a first state of the pairwise states associated with a first time and a second state of the pairwise states associated with a second time after the first time.

Z: The system of any of paragraphs U-Y, wherein the machine learned model comprises an encoder and a decoder.

AA: The system of paragraph Z, wherein the decoder comprises one or more of: a recurrent neural network; a network configured to regress a plurality of prediction probabilities substantially simultaneously; or a network comprising a two dimensional convolutional-transpose network.

AB: The system of any of paragraphs U-AA, wherein: the multi-channel image further comprises one or more channels comprising additional object information of additional objects in the environment, the multi-channel image is one of a plurality of multi-channel images associated with a previous time prior to a current time; and inputting the multi-channel image into the machine learned model comprises inputting a concatenation of the plurality of multi-channel images.

AC: A method comprising: receiving map data of an environment; receiving object data representing an object in the environment, the object data comprising a captured trajectory of the object and a bounding box associated with the object; generating, based at least in part on the map data and the object data, a multi-channel image representing a top-down view of the environment, the multi-channel image comprising the bounding box associated with the object and velocity information associated with the object; inputting the multi-channel image into a machine learned model; receiving, from the machine learned model, a prediction probability associated with the object; and controlling, based at least in part on the prediction probability, an autonomous vehicle to traverse the environment.

AD: The method of paragraph AC, wherein the predicted probability comprises a multi-modal Gaussian trajectory.

AE: The method of paragraph AC or AD, wherein the prediction probability comprises an occupancy grid associated with a future time, and wherein a cell of the occupancy grid is indicative of a probability of the object being in a region associated with the cell at the future time.

AF: The method of any of paragraphs AC-AE, wherein the prediction probability associated with the object is determined as an optimization over pairwise states, a first state of the pairwise states associated with a first time and a second state of the pairwise states associated with a second time after the first time.

AG: The method of any of paragraphs AC-AF, wherein the machine learned model comprises an encoder and a decoder.

AH: The method of paragraph AG, wherein the decoder comprises one or more of: a recurrent neural network; a network configured to regress a plurality of prediction probabilities substantially simultaneously; or a network comprising a two dimensional convolutional-transpose network.

AI: The method of any of paragraphs AC-AH, wherein: the multi-channel image further comprises one or more channels comprising additional object information of additional objects in the environment; the multi-channel image is one of a plurality of multi-channel images associated with a previous time prior to a current time; and inputting the multi-channel image into the machine learned model comprises inputting a concatenation of the plurality of multi-channel images.

AJ: A non-transitory computer-readable medium storing instructions that, when executed, cause one or more processors to perform operations comprising: receiving map data of an environment; receiving object data representing an object in the environment, the object data comprising a captured trajectory of the object and a bounding box associated with the object; generating, based at least in part on the map data and the object data, a multi-channel image representing a top-down view of the environment, the multi-channel image comprising the bounding box associated with the object and velocity information associated with the object; inputting the multi-channel image into a machine learned model; receiving, from the machine learned model, a prediction probability associated with the object; and controlling, based at least in part on the prediction probability, an autonomous vehicle to traverse the environment.

AK: The non-transitory computer-readable medium of paragraph AJ, wherein the predicted probability comprises a multi-modal Gaussian trajectory conditioned on a latent variable.

AL: The non-transitory computer-readable medium of paragraph AJ or AK, wherein the prediction probability comprises an occupancy grid associated with a future time, and wherein a cell of the occupancy grid is indicative of a probability of the object being in a region associated with the cell at the future time.

AM: The non-transitory computer-readable medium of any of paragraphs AJ-AL, wherein: the machine learned model comprises an encoder and a decoder; and the decoder comprises one or more of: a recurrent neural network; a network configured to regress a plurality of prediction probabilities substantially simultaneously; or a network comprising a two dimensional convolutional-transpose network.

AN: The non-transitory computer-readable medium of any of paragraphs AJ-AM, wherein: the multi-channel image further comprises one or more channels comprising additional object information of additional objects in the environment; the multi-channel image is one of a plurality of multi-channel images associated with a previous time prior to a current time; and inputting the multi-channel image into the machine learned model comprises inputting a concatenation of the plurality of multi-channel images.

AO: A system comprising: one or more processors; and one or more computer-readable media storing instructions executable by the one or more processors, wherein the instructions, when executed, cause the system to perform operations comprising: receiving map data of an environment; receiving vehicle data representing a vehicle in the environment, the vehicle data comprising a captured trajectory of the vehicle and a bounding box associated with the vehicle; generating, based at least in part on the map data and the vehicle data, an image representing a top-down view of the environment, the image comprising the bounding box associated with the vehicle and velocity information associated with the vehicle; training a machine learned model to generate prediction probabilities associated with the vehicle, wherein the training comprises minimizing a least squares error based at least in part on an output trajectory and the captured trajectory; and sending the machine learned model to an autonomous vehicle, wherein the autonomous vehicle is to be controlled based at least in part on the machine learned model.

AP: The system of paragraph AO, wherein the machine learned model comprises at least one of: a two dimensional convolutional-transpose network; or a recurrent neural network (RNN) decoder.

AQ: The system of paragraph AO or AP, wherein generating the image comprises: generating a first channel of the image based at least in part on the map data; generating a second channel of the image based at least in part on the vehicle data; and generating a third channel of the image based at least in part on other vehicles represented in the environment.

AR: The system of any of paragraphs AO-AQ, wherein generating the image comprises: determining a reference frame based at least in part on a location of the vehicle in the environment.

AS: The system of any of paragraphs AO-AR, wherein an output of the machine learned model comprises at least one of: a Gaussian probability associated with a predicted location of the vehicle; or a heatmap representing the prediction probabilities associated with the vehicle.

AT: A method comprising: receiving map data of an environment; receiving object data representing an object in the environment; generating, based at least in part on the map data and the object data, an image representing a top-down view of the environment; training a machine learned model to generate prediction probabilities associated with the object, wherein the training is based at least in part on an error associated with a captured trajectory associated with the object; and sending the machine learned model to a vehicle, wherein the vehicle is to be controlled based at least in part on the machine learned model.

AU: The method of paragraph AT, wherein the error is based at least in part on an L2 distance between a prediction of the machine learned model and the captured trajectory.

AV: The method of paragraph AT or AU, wherein the machine learned model comprises a convolutional neural network (CNN).

AW: The method of paragraph AV, wherein the machine learned model comprises at least one of: a two-dimensional convolutional-transpose network; or a recurrent neural network (RNN) decoder.

AX: The method of any of paragraphs AT-AW, wherein the image comprises a plurality of channels, a channel of the plurality of channels comprising at least one of: a location of the object; an extent of the object; a bounding box associated with the object; velocity information associated with the object; acceleration information associated with the object; turn indicator status of the object; the map data associated with the environment; or traffic light information associated with the environment.

AY: The method of any of paragraphs AT-AX, wherein the machine learned model comprises temporal convolutions.

AZ: The method of any of paragraphs AT-AY, wherein at least one of the map data or the object data is captured by an autonomous vehicle traversing the environment.

BA: The method of any of paragraphs AT-AZ, wherein the object data comprises velocity data associated with the object, and wherein generating the image representing the top-down view of the environment comprise representing the velocity data as a vector associated with the object in the image.

BB: The method of any of paragraphs AT-BA, wherein training the machine learned model comprises normalizing pixel values associated with the image representing the top-down view of the environment.

BC: The method of any of paragraphs AT-BB, wherein an output of the machine learned model comprises at least one of: a Gaussian probability associated with a predicted location of the object; or a heatmap representing the prediction probabilities associated with the object.

BD: A non-transitory computer-readable medium storing instructions that, when executed, cause one or more processors to perform operations comprising: receiving map data of an environment; receiving object data representing an object in the environment; generating, based at least in part on the map data and the object data, an image representing a top-down view of the environment; training a machine learned model to generate prediction probabilities associated with the object, wherein the training is based in part on an error associated with a captured trajectory associated with the object; and sending the machine learned model to a vehicle, wherein the vehicle is to be controlled based at least in part on the machine learned model.

BE: The non-transitory computer-readable medium of paragraph BD, wherein the error is based at least in part on an L2 distance between a prediction of the machine learned model and the captured trajectory.

BF: The non-transitory computer-readable medium of paragraph BD or BE, wherein the machine learned model comprises a convolutional neural network comprising at least one of: a two-dimensional convolutional-transpose network; or a recurrent neural network (RNN) decoder.

BG: The non-transitory computer-readable medium of any of paragraphs BD-BF, wherein the image comprises a plurality of channels, a channel of the plurality of channels comprising at least one of: a location of the object; an extent of the object; a bounding box associated with the object; velocity information associated with the object; acceleration information associated with the object; turn indicator status of the object; the map data associated with the environment; or traffic light information associated with the environment.

BH: The non-transitory computer-readable medium of any of paragraphs BD-BG, wherein an output of the machine learned model comprises at least one of: a Gaussian probability associated with a predicted location of the object; or a heatmap representing the prediction probabilities associated with the object.

While the example clauses described above are described with respect to one particular implementation, it should be understood that, in the context of this document, the content of the example clauses can also be implemented via a method, device, system, a computer-readable medium, and/ or another implementation. Additionally, any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   receiving map data associated with an environment;
   receiving object data associated with an object in the environment;
   generating, based at least in part on the map data and the object data, a multi-channel data structure representing the environment from a top-down perspective, wherein a channel of the multi-channel data structure includes a portion of the object data, wherein the portion of the object data comprises at least one of a semantic label, a bounding box associated with the object, a velocity associated with the object, or an acceleration associated with the object;
   inputting the multi-channel data structure into a machine learned model;
   receiving, from the machine learned model and based at least in part on the multi-channel data structure, a prediction probability associated with the object; and
   controlling, based at least in part on the prediction probability, a vehicle to traverse the environment.

2. The system of claim 1, wherein at least some of the object data is included in another channel of the multi-channel data structure.

3. The system of claim 1, wherein the object data comprises semantic information indicative of at least one of a bounding box associated with the object, movement information associated with the object, or a classification associated with the object.

4. The system of claim 1, wherein a classification associated with the object is represented as a color in the channel, and wherein an intensity of the color is indicative of a magnitude of an attribute of the object.

5. The system of claim 1, wherein another channel of the multi-channel data structure includes semantic information associated with the environment, the semantic information comprising at least one of road network information or a traffic light status.

6. The system of claim 1, wherein the portion of the object data included in the channel of the multi-channel data structure is encoded with an attribute indicating at least one of a color or a location associated with the object.

7. The system of claim 1, wherein the prediction probability comprises at least one of:
   a multi modal Gaussian trajectory; or
   an occupancy grid associated with a future time, wherein a cell of the occupancy grid is indicative of a probability of the object being in a region associated with the cell at the future time.

8. The system of claim 1, wherein the multi-channel data structure further comprises one or more additional channels including semantic information associated with at least one of the environment or objects in the environment.

9. A method comprising:
   receiving map data associated with an environment;
   receiving object data associated with an object in the environment;
   generating, based at least in part on the map data and the object data, a multi-channel data structure representing the environment from a top-down perspective, wherein a channel of the multi-channel data structure includes a portion of the object data, wherein the portion of the object data comprises at least one of a semantic label, a bounding box associated with the object, a velocity associated with the object, or an acceleration associated with the object;
   inputting the multi-channel data structure into a machine learned model;
   receiving, from the machine learned model and based at least in part on the multi-channel data structure, a prediction probability associated with the object; and
   controlling, based at least in part on the prediction probability, a vehicle to traverse the environment.

10. The method of claim 9, wherein at least some of the object data is included in another channel of the multi-channel data structure.

11. The method of claim 9, wherein the object data comprises semantic information indicative of at least one of a bounding box associated with the object, movement information associated with the object, or a classification associated with the object.

12. The method of claim 9, wherein a classification associated with the object is represented as a color in the channel, and wherein an intensity of the color is indicative of a magnitude of an attribute of the object.

13. The method of claim 9, wherein another channel of the multi-channel data structure includes semantic information associated with the environment, the semantic information comprising at least one of road network information or a traffic light status.

14. The method of claim 9, wherein the portion of the object data included in the channel of the multi-channel data structure is encoded with an attribute indicating at least one of a color or a location associated with the object.

15. The method of claim 9, wherein the prediction probability comprises at least one of:
- a multi modal Gaussian trajectory; or
- an occupancy grid associated with a future time, wherein a cell of the occupancy grid is indicative of a probability of the object being in a region associated with the cell at the future time.

16. The method of claim 9, wherein the multi-channel data structure further comprises one or more additional channels including semantic information associated with at least one of the environment or objects in the environment.

17. A non-transitory computer-readable medium storing instructions that, when executed, cause one or more processors to perform operations comprising:
- receiving map data associated with an environment;
- receiving object data associated with an object in the environment;
- generating, based at least in part on the map data and the object data, a multi-channel data structure representing the environment from a top-down perspective, wherein a channel of the multi-channel data structure includes a portion of the object data, wherein the portion of the object data comprises at least one of a semantic label, a bounding box associated with the object, a velocity associated with the object, or an acceleration associated with the object;
- inputting the multi-channel data structure into a machine learned model;
- receiving, from the machine learned model and based at least in part on the multi-channel data structure, a prediction probability associated with the object; and
- controlling, based at least in part on the prediction probability, a vehicle to traverse the environment.

18. The non-transitory computer-readable medium of claim 17, wherein at least some of the object data is included in another channel of the multi-channel data structure.

19. The non-transitory computer-readable medium of claim 17, wherein the object data is indicative of at least one of a bounding box associated with the object, movement information associated with the object, or a classification associated with the object.

20. The non-transitory computer-readable medium of claim 17, wherein another channel of the multi-channel data structure includes semantic information associated with the environment, the semantic information comprising at least one of road network information or a traffic light status.

* * * * *